(12) United States Patent
Erol et al.

(10) Patent No.: US 7,779,355 B1
(45) Date of Patent: Aug. 17, 2010

(54) TECHNIQUES FOR USING PAPER DOCUMENTS AS MEDIA TEMPLATES

(75) Inventors: Berna Erol, Cupertino, CA (US);
Jonathan J. Hull, San Carlos, CA (US);
Jamey Graham, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 215 days.

(21) Appl. No.: 10/813,901

(22) Filed: Mar. 30, 2004

(51) Int. Cl.
*G06F 17/00* (2006.01)

(52) U.S. Cl. .................. 715/273; 715/231; 715/716; 715/723; 715/748

(58) Field of Classification Search ............... 707/204; 725/1; 382/306; 386/95; 715/512, 209, 715/233, 704, 714, 716, 730–733, 273, 234; 345/732

See application file for complete search history.

(56) References Cited

U.S. PATENT DOCUMENTS

| | | | |
|---|---|---|---|
| 4,417,239 A | 11/1983 | Demke et al. |
| 4,481,412 A | 11/1984 | Fields |
| 4,823,303 A | 4/1989 | Terasawa |
| 5,153,831 A | 10/1992 | Yianilos |
| 5,250,787 A | 10/1993 | Arii et al. |
| 5,258,880 A | 11/1993 | Takahashi |
| 5,309,359 A | 5/1994 | Katz et al. |
| 5,349,658 A | 9/1994 | O'Rourke et al. |
| 5,382,776 A | 1/1995 | Arii et al. |
| 5,384,703 A | 1/1995 | Withgott et al. |
| 5,404,295 A | 4/1995 | Katz et al. |
| 5,418,948 A | 5/1995 | Turtle |
| 5,442,795 A | 8/1995 | Levine et al. |
| 5,467,288 A | 11/1995 | Fasciano et al. |
| 5,479,600 A | 12/1995 | Wroblewski et al. |
| 5,481,666 A | 1/1996 | Nguyen et al. |
| 5,485,554 A | 1/1996 | Lowitz et al. |
| 5,583,980 A | 12/1996 | Anderson |
| 5,596,700 A | 1/1997 | Darnell et al. |
| 5,600,775 A | 2/1997 | King et al. |
| 5,638,543 A | 6/1997 | Pedersen et al. |
| 5,675,752 A | 10/1997 | Scott et al. |
| 5,680,636 A | 10/1997 | Levine et al. |

(Continued)

FOREIGN PATENT DOCUMENTS

EP 248 403 A2 12/1987

(Continued)

OTHER PUBLICATIONS

Jonathan J. Hull "Document image similarity and equivalent detection" dated Nov. 29, 1997 by IJDAR pp. 37-42.*

(Continued)

*Primary Examiner*—Doug Hutton
*Assistant Examiner*—Quoc A Tran
(74) *Attorney, Agent, or Firm*—Townsend and Townsend and Crew LLP

(57) ABSTRACT

Techniques for creating a composite image are provided. The techniques include receiving an electronic representation of a paper document. Features in the electronic representation are then extracted and compared to recorded information to determine matching information. For example, the matching information may be presentations and/or pages in the recorded information. Information is then determined based on the matching information and the received electronic representation. The composite electronic representation is then created using the determined information.

58 Claims, 8 Drawing Sheets

U.S. PATENT DOCUMENTS

| | | | |
|---|---|---|---|
| 5,694,559 | A | 12/1997 | Hobson et al. |
| 5,706,097 | A | 1/1998 | Schelling et al. |
| 5,721,897 | A | 2/1998 | Rubinstein |
| 5,737,599 | A | 4/1998 | Rowe et al. |
| 5,745,756 | A | 4/1998 | Henley |
| 5,748,805 | A | 5/1998 | Withgott et al. |
| 5,751,283 | A | 5/1998 | Smith |
| 5,758,037 | A | 5/1998 | Schroeder |
| 5,761,655 | A | 6/1998 | Hoffman |
| 5,778,397 | A | 7/1998 | Kupiec et al. |
| 5,781,785 | A | 7/1998 | Rowe et al. |
| 5,784,616 | A | 7/1998 | Horvitz |
| 5,790,114 | A | 8/1998 | Geaghan et al. |
| 5,809,318 | A | 9/1998 | Rivette et al. |
| 5,819,301 | A | 10/1998 | Rowe et al. |
| 5,832,474 | A | 11/1998 | Lopresti et al. |
| 5,838,317 | A | 11/1998 | Bolnick et al. |
| 5,857,185 | A | 1/1999 | Yamaura |
| 5,860,074 | A | 1/1999 | Rowe et al. |
| 5,870,770 | A | 2/1999 | Wolfe |
| 5,873,107 | A | 2/1999 | Borovoy et al. |
| 5,892,536 | A | 4/1999 | Logan et al. |
| 5,894,333 | A | 4/1999 | Kanda et al. |
| 5,895,476 | A | 4/1999 | Orr et al. |
| 5,898,166 | A | 4/1999 | Fukuda et al. |
| 5,898,709 | A | 4/1999 | Imade et al. |
| 5,933,829 | A | 8/1999 | Durst et al. |
| 5,933,841 | A | 8/1999 | Schumacher et al. |
| 5,943,679 | A | 8/1999 | Niles et al. |
| 5,946,678 | A | 8/1999 | Aalbersberg |
| 5,950,187 | A | 9/1999 | Tsuda |
| 5,978,773 | A | 11/1999 | Hudetz et al. |
| 5,986,692 | A | 11/1999 | Logan et al. |
| 5,987,454 | A | 11/1999 | Hobbs |
| 5,999,173 | A | 12/1999 | Ubillos |
| 6,005,562 | A | 12/1999 | Shiga et al. |
| 6,006,218 | A | 12/1999 | Breese et al. |
| 6,021,403 | A | 2/2000 | Horvitz et al. |
| 6,026,409 | A | 2/2000 | Blumenthal |
| 6,028,601 | A | 2/2000 | Machiraju et al. |
| 6,055,542 | A | 4/2000 | Nielsen et al. |
| 6,061,758 | A | 5/2000 | Reber et al. |
| 6,078,936 | A | 6/2000 | Martin et al. |
| 6,094,648 | A | 7/2000 | Aalbersberg |
| RE36,801 | E | 8/2000 | Logan et al. |
| 6,098,082 | A | 8/2000 | Gibbon et al. |
| 6,101,503 | A | 8/2000 | Cooper et al. |
| 6,108,656 | A | 8/2000 | Durst et al. |
| 6,122,647 | A | 9/2000 | Horowitz et al. |
| 6,125,229 | A | 9/2000 | Dimitrova et al. |
| 6,151,059 | A | 11/2000 | Schein et al. |
| 6,160,633 | A | 12/2000 | Mori |
| 6,182,090 | B1 | 1/2001 | Peairs |
| 6,199,048 | B1 | 3/2001 | Hudetz et al. |
| 6,211,869 | B1 | 4/2001 | Loveman et al. |
| 6,243,713 | B1 | 6/2001 | Nelson et al. |
| 6,262,724 | B1 | 7/2001 | Crow et al. |
| 6,369,811 | B1 | 4/2002 | Graham et al. |
| 6,370,498 | B1 | 4/2002 | Flores et al. |
| 6,421,067 | B1 | 7/2002 | Kamen et al. |
| 6,430,554 | B1 | 8/2002 | Rothschild |
| 6,434,561 | B1 | 8/2002 | Durst, Jr. et al. |
| 6,459,498 | B2 | 10/2002 | Miyake et al. |
| 6,505,153 | B1 | 1/2003 | Van Thong et al. |
| 6,518,986 | B1 | 2/2003 | Mugura |
| 6,542,933 | B1 | 4/2003 | Durst, Jr. et al. |
| 6,546,385 | B1 | 4/2003 | Mao et al. |
| 6,567,980 | B1 | 5/2003 | Jain et al. |
| 6,596,031 | B1 | 7/2003 | Parks |
| 6,608,563 | B2 | 8/2003 | Weston et al. |
| 6,623,528 | B1 | 9/2003 | Squilla et al. |
| 6,636,869 | B1 | 10/2003 | Reber et al. |
| 6,647,535 | B1 * | 11/2003 | Bozdagi et al. ............. 715/255 |
| 6,651,053 | B1 | 11/2003 | Rothschild |
| 6,665,490 | B2 * | 12/2003 | Copperman et al. ........... 386/95 |
| 6,675,165 | B1 | 1/2004 | Rothschild |
| 6,684,368 | B1 | 1/2004 | Hull et al. |
| 6,732,915 | B1 | 5/2004 | Nelson et al. |
| 6,745,234 | B1 | 6/2004 | Philyaw et al. |
| 6,760,541 | B1 | 7/2004 | Ohba |
| 6,766,363 | B1 | 7/2004 | Rothschild |
| 6,781,609 | B1 | 8/2004 | Barker et al. |
| 6,865,608 | B2 | 3/2005 | Hunter |
| 6,865,714 | B1 | 3/2005 | Liu et al. |
| 6,993,573 | B2 | 1/2006 | Hunter |
| 7,051,271 | B1 * | 5/2006 | Chiu et al. .................. 715/203 |
| 7,086,032 | B2 * | 8/2006 | Nirell et al. ................. 717/113 |
| 7,206,773 | B2 | 4/2007 | Erol et al. |
| 7,215,436 | B2 | 5/2007 | Hull et al. |
| 7,263,659 | B2 | 8/2007 | Hull et al. |
| 2001/0005203 | A1 | 6/2001 | Wiernik |
| 2001/0013041 | A1 | 8/2001 | Beck et al. |
| 2001/0044810 | A1 | 11/2001 | Timmons |
| 2002/0036800 | A1 | 3/2002 | Nozaki et al. |
| 2002/0047870 | A1 | 4/2002 | Carro |
| 2002/0056082 | A1 | 5/2002 | Hull et al. |
| 2002/0059342 | A1 | 5/2002 | Gupta et al. |
| 2002/0070982 | A1 | 6/2002 | Hill et al. |
| 2002/0095460 | A1 | 7/2002 | Benson |
| 2002/0097426 | A1 | 7/2002 | Gusmano et al. |
| 2002/0099452 | A1 | 7/2002 | Kawai |
| 2002/0111960 | A1 * | 8/2002 | Irons et al. .................. 707/204 |
| 2002/0116575 | A1 | 8/2002 | Toyomura et al. |
| 2002/0120939 | A1 | 8/2002 | Wall et al. |
| 2002/0135808 | A1 | 9/2002 | Parry |
| 2002/0191013 | A1 | 12/2002 | Abrams |
| 2002/0199149 | A1 | 12/2002 | Nagasaki et al. |
| 2003/0009342 | A1 | 1/2003 | Haley |
| 2003/0052897 | A1 | 3/2003 | Lin |
| 2003/0065665 | A1 | 4/2003 | Kinjo |
| 2003/0156589 | A1 | 8/2003 | Suetsugu |
| 2004/0006577 | A1 | 1/2004 | Rix |
| 2004/0008209 | A1 | 1/2004 | Adams et al. |
| 2004/0015524 | A1 | 1/2004 | Chalstrom et al. |
| 2004/0037540 | A1 | 2/2004 | Frohlich et al. |
| 2004/0064338 | A1 | 4/2004 | Shiota et al. |
| 2004/0064339 | A1 | 4/2004 | Shiota et al. |
| 2004/0071441 | A1 | 4/2004 | Foreman et al. |
| 2004/0100506 | A1 | 5/2004 | Shiota et al. |
| 2004/0113935 | A1 * | 6/2004 | O'Neal et al. ............... 345/732 |
| 2004/0153969 | A1 | 8/2004 | Rhodes |
| 2004/0181747 | A1 | 9/2004 | Hull et al. |
| 2004/0181815 | A1 | 9/2004 | Hull et al. |
| 2004/0247298 | A1 | 12/2004 | Ohba |
| 2005/0041872 | A1 | 2/2005 | Yim et al. |
| 2005/0223322 | A1 | 10/2005 | Graham et al. |
| 2007/0106932 | A1 * | 5/2007 | Coar ......................... 715/512 |

FOREIGN PATENT DOCUMENTS

| | | |
|---|---|---|
| EP | 0 459 793 A1 | 12/1991 |
| EP | 737 927 A2 | 10/1996 |
| EP | 459 174 B1 | 11/1996 |
| EP | 762 297 A2 | 3/1997 |
| EP | 788 063 A2 | 8/1997 |
| EP | 788 064 A2 | 8/1997 |
| EP | 802 492 A1 | 10/1997 |
| GB | 2 137 788 A | 10/1984 |
| GB | 2 156 118 A | 10/1985 |
| GB | 2 234 609 A | 2/1991 |
| GB | 2 290 898 A | 1/1996 |
| JP | 8-297677 A | 11/1996 |
| JP | 2004/021165 A | 1/2004 |
| WO | WO 99/50736 A1 | 10/1999 |

WO    WO 00/52596 A2    9/2000

OTHER PUBLICATIONS

Aboud, Gregory D. et al.; "Building a Digital Library of Captured Educational Experiences"; 2000, *International Conference on Digital Libraries,* 8 pages.

Chiu, Patrick et al.; "NoteLook: Taking Notes in Meetings with Digital Video and Ink"; 1999, *Proceedings of ACM Multimedia,* pp. 149-158.

Lee, Dar-Shyang et al.; "MinuteAid; Multimedia Note-Taking in an Intelligent Meeting Room"; 200, *IEEE ICME Conference,* 4 pages.

About Telus investors glossary, pp. 1-7, printed on Apr. 14, 2005, at URL: http://about.telus.com/investors/glossary.html.

Adobe Acrobat Reader—Version 2.0—Figures 1-10, Copyright 1987-1994, 10 pages, Adobe Systems Inc.

Adobe Acrobat Reader—Version 3.0—Screen Dumps, 3 Pages, 1996.

Adobe Photoshop—Version 4.0—User Guide, Copyright 1991-1994, and 1996, 3 pages, Adobe Systems Inc.

"Adobe Premiere, version 6.0—At a Glance," Macintosh OS 9.0.4/Windows 98/2000/NI/Windows ME, Copyright 2000, 2 pages, Adobe Systems, Inc., San Jose, CA.

Adobe Premiere 6.0—The essential tool for professional digital video editing, Copyright 2000, 2 pages, Adobe Systems Inc, San Jose, CA.

Ball, et al., "Software Visualization in the Large," IEEE Computer, Apr. 17, 1996, 28 pages, vol. 29, No. 4, IEEE.

Begole, et al., "Flexible Collaboration Transparency," doc. ID: ncstr. vatech_cs/TR-98-11, 1998, 10 pages, Virginia Polytechnic Institute and State University, Blackburg, Virginia.

Begole, et al., "Supporting Worker Independence in Collaboration Transparency," doc. ID: ncstrl.vatech_cs/TR-98-12, 1998, 11 pages, Virginia Polytechnic Institute and State University, Blacksburg, Virgina.

Bobick, et al., "A State-Based Approach to the Representation and Recognition of Gesture," IEEE Transactions on Pattern Analysis and Machine Intelligence, Dec. 1997, pp. 1325-1337, vol. 19, No. 12, IEEE.

Boguraev, et al., "Salience-Based Content Characterisation of Text Documents," INM T.J. Watson Research Center, 12 pages, 1997.

Boreczky, et al., "An Interactive Comic Book Presentation for Exploring Video," CHI Letters, CHI 2000, Apr. 1-6, 2000, pp. 185-192, vol. 2, issue 1, ACM Press.

Boykin, et al., " Machine learning of Event Segmentation for News on Demand," Communications of the ACM, Feb. 2000, pp. 35-41, vol. 43, No. 2.

Boykin, et al., "Improving Broadcast News Segmentation Processing," IEEE Multimedia '99, Copyright 1999, 6 pages.

Brandow, et al., "Automatic Condensation of Electronic Publications by Sentence Selection," Information Processing & Management, Copyright 1995, pp. 675-685, vol. 31, No. 5, Pergamon.

Brotherton, et al., "Automated Capture, Integration, and Visualization of Multiple Media Streams," Proceedings of IEEE Multimedia '98, 1998, 12 pages.

Brown, et al., "Automatic Content-Based Retrieval of Broadcast News," ACM Multimedia '95—electronic Proceedings, San Francisco, CA, Nov. 5-9, 1995, printed on Apr. 26, 2002, 20 pages, at URL: http://svr-www.eng.cam.ac.uk/research/projects/vmr/mm95.html.

Byrd, "A Scrollbar-based Visualization for Document Navigation," doc. ID: xxx.cs.IR/9902028, Computing Research Repository: Information Retrieval , Copyright 1999, pp. 122-129, ACM Press.

Chen, et al., "Emotion Recognition From Audiovisual Information," Proceedings IEEE Workshop on Multimedia Signal Processing, Los Angeles, CA, Copyright 1998, pp. 83-88.

Chen, et al., "ViBE: A Video Indexing and Browsing Environment," Proceedings of the SPIE Conference on Multimedia Storage and Archiving Systems, Boston, MA, Sep. 20-22, 1999, pp. 148-164.

Chiu, et al., "NoteLook: Taking Notes in Meetings with Digital Video and Ink," ACM Multimedia '99 Orlando, FL, Oct. 1999, pp. 149-158, ACM.

Chiu, et al., "Automatically linking multimedia meeting documents by image matching," Proceedings of Hypertext '00, New York, N.Y., 2000, pp. 244-245, ACM.

Chiu, et al., "Room with a Rear View—Meeting Capture in a Multimedia Conference Room," IEEE Multimedia Magazine, Copyright 2000, pp. 48-54, vol. 7, No. 4, IEEE.

Choi, et al., "An Integrated Data Model and a Query Language for Content-Based Retrieval of Video," MIS '98 LNCS 1508, Copyright 1998, pp. 192-198, Copyright Springer Verlag Berlin Heidelberg.

Christel, et al., "Evolving Video Skims into Useful Multimedia Abstractions," Proceedings of the CHI '98 Conference on Human Factors in Computing Systems, Los Angeles, CA, Apr. 1998, pp. 171-178.

Christel, et al., "Information Visualization within a Digital Video Library," Journal of Intelligent Information Systems, Copyright 1998, 25 pages.

"Computer Terms," printed on Apr. 14, 2005, pp. 1-8, at URL: http:www.park-meadow.org/computer_terms.htm.

Dellaert, et al., "Recognizing emotion in speech," Proceedings ICSLP '96,. Fourth International Conference on Spoken Language Processing New York, N.Y. Copyright 1996, pp. 1970-1973, IEEE.

Dimitrova, et al., "Video Keyframe Extraction and Filtering: A Keyframe is not a Keyframe to Everyone," CIKM 1997, Las Vegas, NV, Copyright 1997, pp. 113-120, ACM.

Doermann, et al., "Applying Algebraic and differential invariants for logo recognition," Machine Vision and Applications, Copyright 1996, pp. 73-86, vol. 9, Springer-Verlag.

Donato, et al., "Classifying Facial Actions", IEEE Transactions on Pattern Analysis and Machine Intelligence, Oct. 1999, pp. 974-989, vol. 21, No. 10, IEEE.

Drucker, et al., "SmartSkip: Consumer Level Browsing and Skipping of Digital Video Content," Paper: Technology to Help People Find Information, Apr. 20-25, 2002, pp. 219-226, vol. 4, issue No. 1, Minneapolis, MN.

Essa, et al., "Coding Analysis Interpretation and Recognition of Facial Expressions," IEEE Transactions on Pattern Analysis and Machine Intelligence, Jul. 1997, pp. 1-8, vol. 19, No. 7, IEEE.

Face recognition techniques described at web site http://www.visionics.com. Frequently Asked Technical Questions, Visionics Corporation, 2002, 36 pages.

"Flexible JAMM—Java Applets Made Mulituser," Screenshots, printed on Dec. 6, 2002, 4 pages, at URL: http://simon.cs.vt.edu.

Foote, et al., "An Intelligent Media Browser using Automatic Multimodal Analysis," ACM Multimedia 8, Bristol, UK, Copyright 1998, 6 pages.

Franklin, et al., "Jabberwocky: you don't have to be a rocket scientist to change slides for a hydrogen combustion lecture," Intelligent User Interfaces, 2000, pp. 98-105.

"Fujitsu Markets Facsimile Connection System for Computer I/0," Comline Telecommunications, Nov. 8, 1989, Copyright 1999, p. 5, The Gale Group.

Furui, et al., "Japanese Broadcast News Transcription and Information Extraction," Communications of the ACM, Feb. 2000, pp. 71-73, vol. 43, No. 2, ACM.

Gauvain, et al., "Transcribing Broadcast News for Audio and Video Indexing," Communications of the ACM, Feb. 2000, pp. 64-70, vol. 43, No. 2, ACM.

Gibbon, "Generating Hypermedia Documents from Transcriptions of Television Programs Using Parallel Text Alignment," Handbook of Internet and Multimedia Systems and Applications, David C. Gibbon; Copyright 1998, 8 pages, CRC Press.

Gliedman, "Virtual Office Managers," Computer Shopper, Copyright 1998, 5 pages, The Gale Group.

"Glossary for computer hardware and micro scope," printed on Apr. 14, 2005, 11 pages, at URL: http://www.mumbaicyber.com/glossary_com_hardware_micro.asp.

"Glossary: What Does It Mean?," printed on Apr. 14, 2005, 3 pages at URL: http://www.fairfield.k12.ct.us/fairfieldhs/cfairfieldhs03/glossary.htm.

Gordon, "Using Annotated Video as an Information Retrieval Interface," IUI 2000 New Orleans, Copyright 2000, pp. 133-140, ACM.

Greenberg, et al., "Awareness Through Fisheye Views in Relaxed-WYSIWIS Groupware," GroupLab The University of Calgary, printed on Nov. 9, 2000, 14 pages, at URL:http://www.cpsc.ucalgary.ca/grouplab/papers/1996/96-Fisheye.Gi/gi96_fisheye.html.

Grunin, "Action!," PC Magazine, 1993, 5 pages, vol. 12, No. 15, The Gale Group.

"Hang on--Blue Sky's WinHelp is on the way," PC Week, Jul. 17, 1995, p. 59, The Gale Group.

Hauptman, et al., "Story Segmentation and Detection of Commercials in Broadcast News Video," ADL-98 Advances in Digital Libraries Conference, Santa Barbara, CA, Apr. 22-24, 1998, 12 pages.

Hauptmann, et al., "Text, Speech, and Vision for Video Segmentation: The Informedia™ Project," Proc. AAAI Fall Symp. Computational Models for Integrating Language and Vision, Boston, MA, Nov. 10-12, 1995, 6 pages.

He, et al., "Comparing Presentation Summaries: Slides vs. Reading vs. Listening," CHI 2000 The Hague, Amsterdam, Apr. 1-6, 2000, pp. 177-184, vol. 2, issue 1, ACM.

Hearst, "TileBars: Visualization of Term Distribution Information in Full Text Information Access," Proceedings of CHI '95, Denver, CO, May 1995, pp. 1-8.

Hecht, "Embedded Data Glyh Technology for Hardcopy Digital Documents," SPIE Proceeding, May 9, 1994, pp. 341-352, vol. 2171.

Hecht, "Printed Embedded Data Graphical User Interfaces," IEEE, Mar. 2001, pp. 47-55, vol. 34, No. 3, IEEE.

Hill, et al., "Edit Wear and Read Wear," CHI '92, May 3-7, 1992, pp. 3-9, ACM.

Hu, et al., "Multimedia Description Framework (MDF) for Content Description of Audio/Video Documents," DL 99, Berkely, CA, Copyright 1999, pp. 67-75, ACM.

"IBM, Partners Team On Web-Based Image Search," Newsbytes News Network, Sep. 29, 1995, 4 pages, The Gale Group.

Identitech, "Identitech announces FYI 2.5.2 release with NT object server, SmartForm, and ODBC," Business Editors, Jul. 8, 1996, 5 pages, Business Wire.

"Identitech Unysis: Unysis wins Florida Housing Finance Agency Contract, Identitech provides workflow software solution," Business Editors/Computer Writers, Copyright 1999, 4 pages, Business Wire.

Ioffe, et al., "Finding people by sampling," Proceedings of the International Conference on Computer Vision, Copyright 1999, 6 pages, vol. 2, IEEE.

"IT&T Talk," printed on Apr. 14, 2005, pp. 1-4, at URL: http://www.iib.qld.gov.au/itcareers/talk.asp.

Jang, et al., "Improving Acoustic Models with Captioned Multimedia Speech," Copyright 1999, pp. 767-771, IEEE.

Jin, et al., "Topic Tracking for Radio, TV Broadcast, and Newswire," printed on Apr. 4, 2002, 9 pages, at URL: http://www.nist.gov/speech/publications/darpa99/html/tdt330/tdt330.html.

Komlodi, et al., "Key frame preview technique for video browsing," Digital Libraries '98, Pittsburgh, PA, Copyright 1998, pp. 118-125, ACM.

Lam, et al., "Automatic document classification based on probabilistic reasoning: model and performance analysis," Copyright 1997, 6 pages, vol. 3, IEEE.

Langley, et al., "An Analysis of Bayesian Classifiers," Proceedings of the Tenth National Conference on Artificial Intelligence, Copyright 1992, 6 pages, AAAI Press, San Jose, CA.

Langley, et al., "Induction of Selective Bayesian Classifiers," Proceedings of the Tenth Conference on Uncertainty in Artificial Intelligence, Copyright 1994, 8 pages, Morgan Kaufmann, Seattle, WA.

Lee, et al., "Portable Meeting Recorder," ACM Multimedia 2002, Juan Les Pins, France, Dec. 1-6, 2002, 10 pages.

Li, et al., "Automatic Text Detection and Tracking in Digital Video," IEEE Transactions on Image Proceedings, Jan. 2000, pp. 147-156, vol. 9, No. 1, IEEE.

Li, et al., "Text Extraction and Recognition in Digital Video," Proceedings of Third IAPR Workshop on Document Analysis Systems, Copyright 1998, pp. 119-128.

Li, et al., "Vision: A Digital Video Library," International Conference on Digital Libraries, Proceedings of the First ACM International Conference on Digital Libraries, Bethesda, Maryland, Copyright 1996, pp. 19-27, ACM, New York, N.Y.

Liang, et al., "A Practical Video Indexing and Retrieval System," Exploiting New Image Sources and Sensors, 26th AIPR Workshop, Proceedings of SPIE, Washington, D.C., Oct. 15-17, 1997, pp. 294-303, vol. 3240.

Lienhart, et al., "Localizing and Segmenting Text in Images and Videos," IEEE Transactions on Circuits and Systems for Video Technology, Apr. 2002, pp. 256-268, vol. 12, No. 4, IEEE.

Lienhart, et al., "On the Detection and Recognition of Television Commercials," Proceedings IEEE Conference on Multimedia Computing and Systems, Ottawa, Canada, Jun. 1997, 13 pages, IEEE.

Lison et al., "Sight and Sound," Unix Review, 1989, 8 pages, vol. 7, No. 10.

Ma, et al., "An Indexing and Browsing System for Home Video," Invited paper, EUSIPCO '2000, 10th European Signal Processing Conference, Tampere, Finland, Sep. 5-8, 2000, 6 pages.

Macintosh Reference, System 7 Reference—Getting Help, Copyright 1991, pp. 30-31, Apple Computer, Inc., Cupertino, CA.

Manber, "The Use of Customized Emphasis in Text Visualization," Preliminary Version, Proceedings 1997 IEEE Conference on Information Visualization—An International Conference on Computer Visualization & Graphics, London, England, Aug. 27-29, 1997, pp. 132-138, IEEE.

Maybury, "News on Demand," Communication of the ACM, Feb. 2000, pp. 33-34, vol. 43, No. 4, ACM.

Maybury, et al., "Multimedia Summaries of Broadcast News," Intelligent Information Systems 1997, printed on Apr. 4, 2002, 12 pages, at URL: http://www.mitre.org/resources/centers/it/g061/bnn/mmiis97.html.

Maybury, et al., "Segmentation, Content Extraction and Visualization of Broadcast News Video using Multistream Analysis," AAAI paper, 1997 printed on Apr. 4, 2001, 11 pages, at URL: http://www.mitre.org/resources/centers/it/g061/bnn/mmaaai97.html.

Merialdo, et al., "Automatic Construction of Personalized TV News Programs," Copyright 1999, 19 pages, ACM.

Merlino, et al., "Broadcast News Navigation using Story Segmentation," printed on Apr. 26, 2002, 22 pages, at URL: http://www.mitre.org/technology/multimedia/mmacm97.html.

Merlino, et al., "Broadcast News Processing Techniques—Method and Evaluation," Apr. 1999, printed on Apr. 4, 2002, 28 pages, at URL: http://www.mitre.org/resources/centers/it/g061/bnn/broadcastnewsprocessing/broadcastnewspr...

Mohan, "Text-based search of TV news stories," Multimedia Storage and Archiving Systems, Proceedings SPIE—The International Society for Optical Engineering, Nov. 18-19, 1996, Boston, MA, pp. 1-13, vol. 2916.

Mukhopadhyay, et al., "Passive Capture and Structuring of Lectures," ACM Multimedia, Orlando, FL, Oct. 1999, pp. 477-487, ACM.

Muller, et al., "The 'Authoring of the Fly' system for Automated Recording and Replay of (Tele)presentations," ACM/Springer Multimedia Systems Journal, 2000, 1 page, vol. 8, No. 3.

"Multimedia," Wikipedia, printed on Apr. 14, 2005, pp. 1-2, at URL: http://en.wikipedia.org/wiki/Multimedia.

Multi-University Research Laboratory—webpage, printed on Feb. 18, 2004, 2 pages, at URL: http://murl.microsoft.com.

Myers, et al., "A Multi-View Intelligent Editor for Digital Video Libraries," JCDL '01, Jun. 24-28, 2001, Roanoke, Virginia, Copyright 2001, 10 pages, ACM.

Oh, et al., "Efficient and Cost-effective Techniques for Browsing and Indexing Large Video Databases," MOD 2000, Dallas, TX, 2000, pp. 415-426, ACM.

Ohmori "A Tool for Programmable Access to Organized Multimedia Data—Enhanced MultiMedia Recorder (EMMR)," Third Asian Pacific Computer and Human Interaction 1998, 4 pages.

Okada et al., "Development of Application Programs for Distributed Processing Equipment," Review of the Electrical Communication Laboratories, Copyright 1986, pp. 465-471, vol. 34, No. 4, The Research and Development Headquarters.

"Olivetti—Video Mail Retrieval Using Voice," printed on Apr. 4, 2002, 7 pags, at URL: http://svr-www.eng.cam.ac.uk/research/Projects/vmr/...

Otsu, "A threshold selection method from gray-level histograms," IEEE Transactions on Systems, Man and Cybernetics, Copyright 1978, pp. 62-66.

Phillips, "MediaView: A General Multimedia Digital Publication System," Communications of the ACM, Jul. 1991, pp. 75-83, vol. 34, No. 7, ACM.

Pimentel, et al., "Linking by Interacting: a Paradigm for Authoring Hypertext," Proceedings of ACM Hypertext '2000, May 2000, 10 pages.

Product Brochure, Shutterfly, printed on Mar. 15, 2005, 10 pages, at URL: http://www.shutterfly.com.

Product Brochure, YesVideo, printed on Mar. 15, 2005, 20 pages, at URL: http://www.yesvideo.com/code.

"Quick Selection of Window Environment Coordinates," IBM Technical Disclosure Bulletin, 1992, 4 pages, International Business Machines Corporation, Armonk, N.Y.

Roschelle, et al., "VideoNoter: A productivity too for video data analysis," Behavior Research Methods, Instruments & Computers, 1991, pp. 219-224, vol. 2, No. 2, Psychonomic Society, Inc.

Rowley, et al., "Neural Network-Based Face Detection," IEEE Transactions on Pattern Analysis and Machine Intelligence, Jan. 1998, pp. 23-38, vol. 20, No. 1, IEEE.

Saur, et al., "Automated Analysis and Annotation of Basketball Video," SPIE, 1997, pp. 176-187, vol. 3022.

Scansoft Capture Development System—webpage, printed on Feb. 18, 2004, 1 page, at URL: http://www.scansoft.com.

Schweighofer, et al., "The Automatic Generation of Hypertext Links in Legal Documents," Wagner, Lecture Notes in Computer Science—Database and Expert Systems Applications, 7th International Conference, DEXA '96, Zurich, Switzerland, Sep. 1996, pp. 889-898, Springer.

Screen Shots of document created in Corel WordPerfect, Apr. 30, 2002, 4 pages.

Shahraray, et al., "Automated Authoring of Hypermedia Documents of Video Programs," ACM Multimedia '95—Electronic Proceedings, San Francisco, CA, Nov. 5-9, 1995, 12 pages.

Shahraray, et al., "Automatic generation of pictorial transcripts of video programs," Multimedia Computing and Networking 1995, Proceedings SPIE, Feb. 6-8, 1995, pp. 512-518, vol. 2417.

Shahraray, et al., "Pictorial Transcripts: Multimedia Processing Applied to Digital Library Creation," 1997 IEEE First Workshop on Multimedia Signal Processing, 1997, pp. 581-586.

Smith, et al., "Video Skimming and Characterization through the Combination of Image and Language Understanding Techniques," IEEE Computer Vision and Pattern Recognition (CVPR), San Juan, PR, 1997, 7 pages, IEEE.

Sodergard, et al., "Integrated multimedia publishing—combining TV and newspaper content on personal channels," printed on Apr. 4, 2002, pp. 1-22, at URL: http:www8.org/w8-papers/lb-multimedia/integrated/integrated.html.

Sonmez, et al., "Multiple Speaker Tracking and Detection: Handset Normalization and Duration Scoring," Digital Signal Processing 10, Copyright 2000, pp. 133-142, Academic Press.

"Spry Inc.'s Internet Front End Picked for PSI Cable Internet Service," Information & Interactive Services Report, Apr. 8, 1994, 3 pages, The Gale Group.

Stifelman, "The Audio Notebook: Paper and Pen Interaction with Structured Speech," Ph.D. Thesis, Massachusetts Institute of Technology, Sep. 1997, 151 pages.

Stifelman, et al., "The Audio Notebook," CHI 2001, Mar. 31 - Apr. 5, 2001, pp. 182-189, vol. 3, issue 1.

Strattner, "HP pioneers I-TV peripheral market," Computer Shopper, Feb. 1994, 2 pages, vol. 14, No. 2, The Gale Group.

Suda, et al., "Logo and Word Matching Using a General Approach to Signal Registration," Fourth International Conference on Document Analysis and Recognition, Ulm, Germany, Aug. 18-20, 1997, pp. 61-65.

Sumita, et al., "Document Structure Extraction for Interactive Document Retrieval Systems," Proceedings SIGDOC '93 The 11th Annual International Conference, Kitchener, Ontario, Oct. 5-8, 1993, pp. 301-310, ACM.

Taghva, et al., "An Evaluation of an Automatic Markup System," SPIE, 1995, pp. 317-327, vol. 2422.

Taxt, et al., "Segmentation of Document Images," IEEE Transactions of Pattern Analysis and Machine Intelligence, Dec. 1989, pp. 1322-1329, vol. 11, No. 12, IEEE.

"TELEform V7—Digitale Beleglesung, Automatische Datenerfassung aus Formularen," Form-Solutions, printed on Feb. 10, 2005, 5 pages, at URL: http://www.form-solutions.net/d1/Teleform.pdf.

Tennenhouse, et al., "A Software-Oriented Approach to the Design of Media Processing Environments," Proceedings of the International Conference on Multimedia Computing and Systems, Boston, MA, May 14-19, 1994, pp. 435-444, IEEE.

Tonomura, et al., "VideoMAP and VideoSpaceIcon: Tools for Anatomizing Video Content," INTERCHI '93, Apr. 24-29, 1993, 8 pages.

Transym Optical Character Recognition engine, Copyright 2003, 1 page, at URL: http://www.transym.com/, Transym Computer Services Ltd.

Trier, et al., "Goal-Directed Evaluation of Binarization Methods," IEEE Transactions on Pattern Analysis and Machine Intelligence, Copyright 1995, pp. 47-58, IEEE.

Uchihashi, et al., "Summarizing Video Using A Shot Importance Measure and A Frame-Packing Algorithm," Proceedings of the International Conference on Acoustics, Speech, and Signal Processing, Phoenix, AZ, 1999, 4 pages.

Uchihashi, et al., "Video Manga: Generating Semantically Meaningful Video Summaries," ACM Multimedia '99, Orlando, FL, Oct. 30-Nov. 5, 1999, 10 pages.

Van Horn-Christopher, "Have you talked to your computer today?," Business Forum, 1994, vol. 19, No. 3, 4, 7 pages, ProQuest Info &Learning.

Video content management and publishing software from Virage, printed on Apr. 26, 2002, Copyright 2002, 3 pages, at URL: http://www.virage.com.

"VNR firm offers Storyboards," ProQuest PR News, Dec. 4, 1995, printed on Aug. 9, 2004, 2 pages, at URL: http://proquest.umi.com/pqdlink?index=20&did=000000010830394&SrchMode=3&sid=1&F.

Wactlar, et al., "Complementary Video and Audio Analysis for Broadcast News Archives—Increasing the Usefulness of Extracted Information," Communications of the ACM, Feb. 2000, pp. 42-47, ACM.

Waibel, et al., "Advances in automatic meeting record creation and access," Proceedings of ICASSP, Seattle, WA, May 7-11, 2001, 4 pages.

"W3C issues first public draft of Synchronized Multimedia Integration Language (SMIL)," Information Today, Feb. 1998, pp. 2 pages, vol. 15, issue 15.

Web pages from PaperClick.com, printed on Jun. 14, 2006, 10 pages, at URL: http://www.paperclip.com.

WebEx Presentation Studio—Brilliant multimedia presentation with on-demand viewing, Copyright 2004, 2 pages, at URL: http://www.presenter.com.

Weiss, et al., "Composition and Search with a Video Algebra," IEEE Multimedia, Copyright 1995, pp. 12-25, IEEE.

Wittenburg, et al., "Browsing with Dynamic Key Frame Collages in Web-Based Entertainment Video Services," In Proceedings of IEEE International Conference on Multimedia Computing and Systems, Florence, Italy, Jun. 7-11, 1999, 6 pages.

Won, et al., "Efficient Use of MPEG-7 Edge Histogram Descriptor;" ETRI Journal; Feb. 2002, pp. 23-30, vol. 24, No. 1.

"Xerox Office Software Suite FlowPort Version 2.1.1," Capture and Distribution, printed on Feb. 10, 2005, 4 pages, at URL: http://www.xrce.xerox.com/showroom/pdf/flowport.pdf.

Zhang, et al., "Detection of Text Captions in Compressed Domain Video," ACM Multimedia Workshop, Marina Del Rey, CA, Copyright 2000, pp. 201-204, ACM.

Non-Final Office Action for U.S. Appl. No. 10/001,895, mailed on Jul. 8, 2004, 24 pages (Copy available via PAIR).

Notice of Allowance for U.S. Appl. No. 10/001,895, mailed on May 19, 2005, 9 pages. (Copy available via PAIR).

Non-Final Office Action for U.S. Appl. No. 10/001,895, mailed on Aug. 3, 2005, 15 pages. (Copy available via PAIR).

Final Office Action for U.S. Appl. No. 10/001,895, mailed on Mar. 22, 2006, 16 pages. (Copy available via PAIR).

Non-Final Office Action for U.S. Appl. No. 10/001,895, mailed on Sep. 20, 2006, 14 pages. (Copy available via PAIR).

Notice of Allowance for U.S. Appl. No. 10/001,895, mailed on May 3, 2007, 4 pages. (Copy available via PAIR).

Non-Final Office Action for U.S. Appl. No. 10/175,540, mailed on Mar. 14, 2006, 21 pages. (Copy available via PAIR).

Final Office Action for U.S. Appl. No. 10/175,540, mailed on Oct. 10, 2006, 18 pages. (Copy available via PAIR).

Notice of Allowance for U.S. Appl. No. 10/175,540, mailed on Dec. 28, 2006, 25 pages. (Copy available via PAIR).

Non-Final Office Action for U.S. Appl. No. 10/660,867, mailed on May 15, 2006, 11 pages. (Copy available via PAIR).

Notice of Allowance for U.S. Appl. No. 10/660,867, mailed on Nov. 1, 2006, 9 pages. (Copy available via PAIR).

* cited by examiner

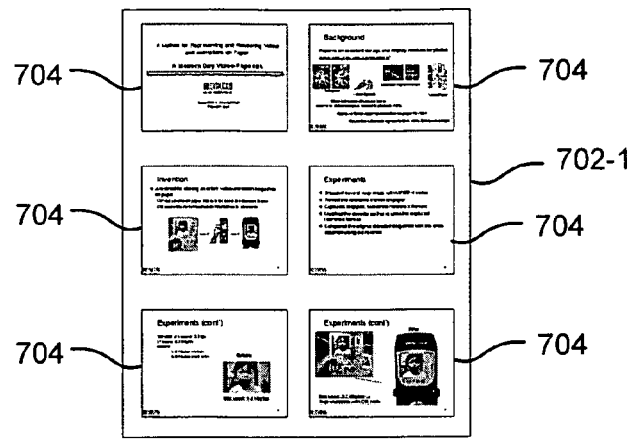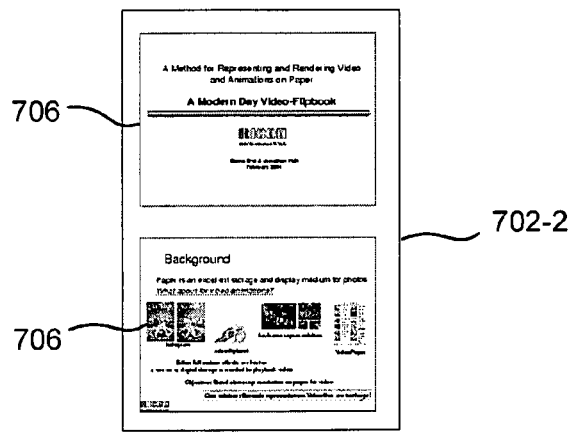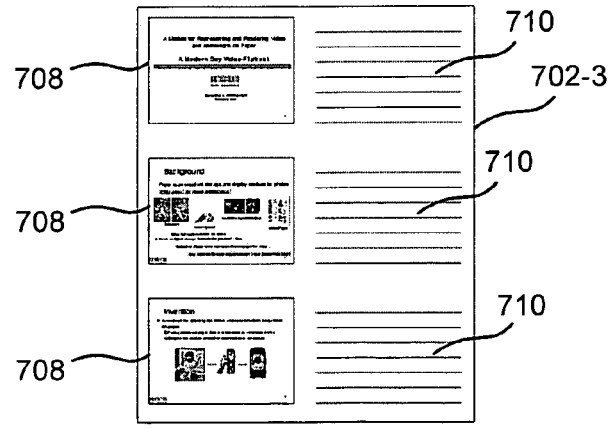
Fig. 6

TECHNIQUES FOR USING PAPER DOCUMENTS AS MEDIA TEMPLATES

CROSS-REFERENCES TO RELATED APPLICATIONS

The present application incorporates by reference for all purposes the entire contents of the following:

U.S. application Ser. No. 09/728,560, entitled "TECHNIQUES FOR CAPTURING INFORMATION DURING MULTIMEDIA PRESENTATIONS", filed Nov. 30, 2000;

U.S. application Ser. No. 09/728,453, entitled "TECHNIQUES FOR RECEIVING INFORMATION DURING MULTIMEDIA PRESENTATIONS & COMMUNICATING THE INFORMATION", filed Nov. 30, 2000;

U.S. application Ser. No. 09/521,252, entitled "METHOD & SYSTEM FOR INFORMATION MANAGEMENT TO FACILITATE THE EXCHANGE OF IDEAS DURING A COLLABORATIVE EFFORT", filed Mar. 8, 2000;

U.S. application Ser. No. 10/001,895, entitled "PAPER-BASED INTERFACE FOR MULTIMEDIA INFORMATION", filed Nov. 19, 2001;

U.S. application Ser. No. 10/660,985, entitled "TECHNIQUES FOR STORING MULTIMEDIA INFORMATION WITH SOURCE DOCUMENTS", filed Sep. 12, 2003;

U.S. application Ser. No. 10/661,052, entitled "TECHNIQUES FOR PERFORMING OPERATIONS ON A SOURCE SYMBOLIC DOCUMENT", filed Sep. 12, 2003;

U.S. application Ser. No. 10/660,867, entitled "TECHNIQUES FOR ACCESSING INFORMATION CAPTURED DURING A PRESENTATION USING A PAPER DOCUMENT FOR THE PRESENTATION", filed Sep. 12, 2003;

U.S. application Ser. No. 10/696,735, entitled "TECHNIQUES FOR USING A CAPTURED ELECTRONIC REPRESENTATION FOR THE RETRIEVAL OF RECORDED INFORMATION", filed Sep. 12, 2003; and U.S. application Ser. No. 10/412,757, entitled "AUTOMATED TECHNIQUES FOR COMPARING CONTENTS OF IMAGES", filed Apr. 11, 2003.

BACKGROUND OF THE INVENTION

The present application relates to field of accessing recorded information, and more particularly to techniques for creating an electronic representation that includes inserted information that is related to recorded information.

Recording information during presentations has gained a lot of popularity in recent years. For example, colleges and universities have started to program classes and lectures, corporations have started to record meetings and conferences, etc. One or more capture devices may record information during a presentation. The recorded information may comprise different types or streams of information including audio information, video information, and the like.

After the presentation, the recorded information is then available for use by a user. A user may review their notes and may want to view the recording of the presentation. The conventional way for accessing these recordings has been by viewing the recordings sequentially. More efficient techniques are desired for accessing or retrieving the recorded information or indexing into the recorded information.

BRIEF SUMMARY OF THE INVENTION

Embodiments of the present invention generally relate to techniques for creating a composite electronic representation. The techniques include receiving an electronic representation of a paper document. Features in the electronic representation are then extracted and compared to recorded information to determine matching information. For example, the matching information may be presentations and/or pages in the recorded information. Information to insert is then determined based on the matching information and the received electronic representation. The composite electronic representation is then created using the determined information.

In one embodiment, a method for creating a composite electronic representation is provided. The method comprises: receiving an electronic representation of a document; extracting a feature from the electronic representation of the document; comparing the feature to the recorded information to determine information in the recorded information that matches the feature; determining information to insert based on the information in the recorded information that matches the feature and the received electronic representation of a document; and creating a composite electronic representation comprising the determined information.

In another embodiment, a method for creating a composite electronic representation of a document using information recorded during a presentation is provided. The method comprises: receiving an electronic representation of a document for the presentation, the electronic representation including a feature that was presented during the presentation; extracting the feature from the electronic representation; comparing the feature to the information recorded during the presentation to determine information in the recorded information that matches the one or more features; and determining information to insert based on the information in the recorded information that matches the feature and the received electronic representation of a document; and creating a composite electronic representation comprising the determined information.

The foregoing, together with other features, embodiments, and advantages of the present invention, will become more apparent when referring to the following specification, claims, and accompanying drawings.

BRIEF DESCRIPTION OF THE DRAWINGS

FIG. 6 depicts paper document templates according to embodiments of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
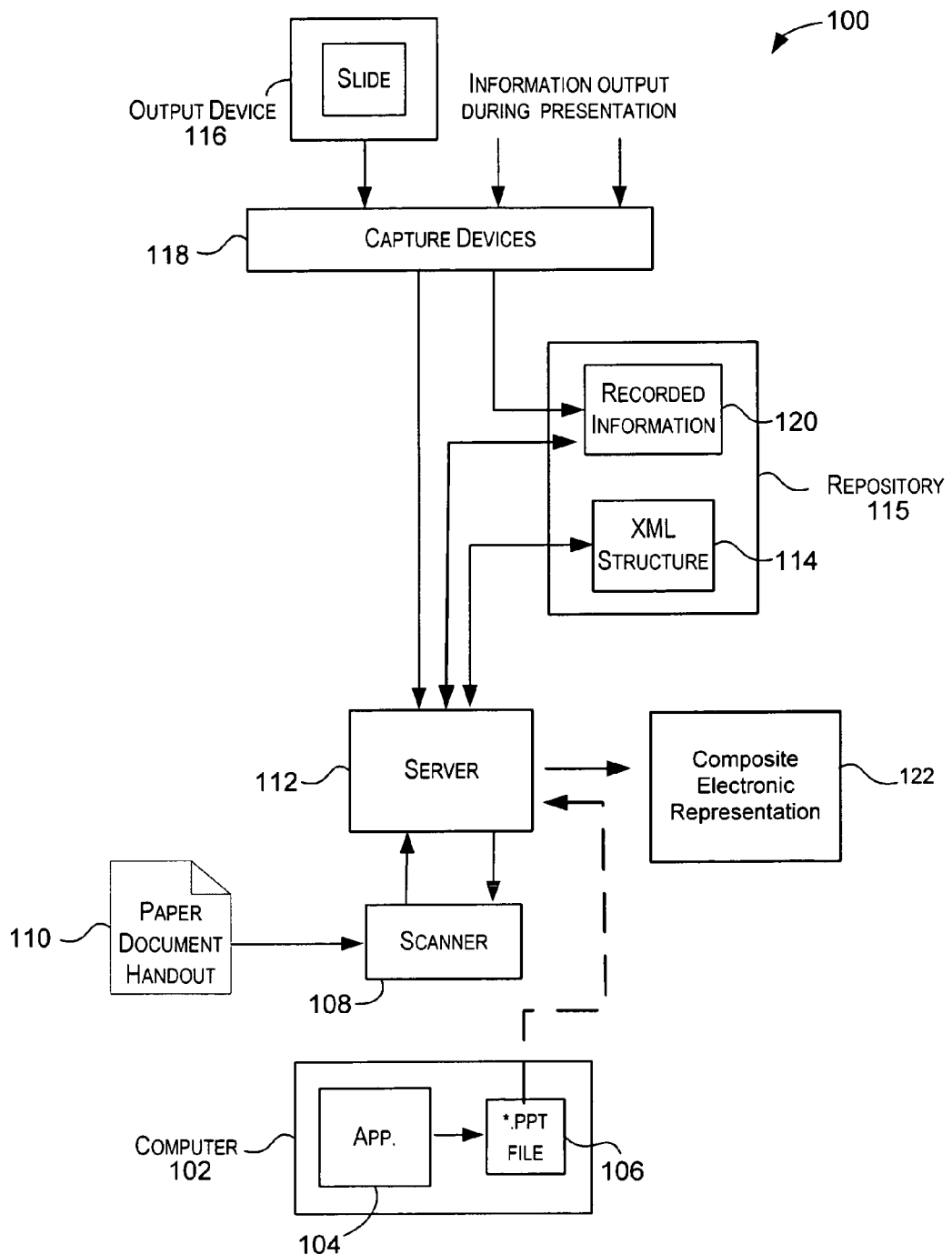
FIG. 1 is a simplified block diagram of a system that may incorporate an embodiment of the present invention.

FIG. 1 is a simplified block diagram of a system 100 that may incorporate an embodiment of the present invention. System 100 depicted in FIG. 1 is merely illustrative of an embodiment incorporating the present invention and does not limit the scope of the invention as recited in the claims. One of ordinary skill in the art would recognize other variations, modifications, and alternatives.

System 100 includes a computer system 102 that may be used by a user to prepare material to be presented at a presentation. Examples of presentations include lectures, meetings, conferences, classes, speeches, demonstrations, etc. The presentation material may include slides, photos, audio messages, video clips, text information, web pages, etc. The user may use one or more applications 104 executed by computer 102 to generate the presentation material. An example of a commonly used application for preparing slides to be presented at a presentation is PowerPoint™ provided by Microsoft™ Corporation. For example, as depicted in FIG. 1, the user may use PowerPoint™ application 104 to create a "presentation.ppt" file 106 (*.ppt file). A *.ppt file created using a PowerPoint™ application can comprise one or more pages, each page comprising one or more slides. A *.ppt file may also store information as to the order in which the slides are to be presented at the presentation and the manner in which the slides will be presented.

In addition to PowerPoint™ presentation files comprising slides, other types of files comprising other presentation material may also be created using different applications executed by computer 102. These files may be referred to in general as "symbolic presentation files". A symbolic presentation file is any file created using an application or program and that comprises at least some content that is to be presented or output during a presentation. A symbolic presentation file may comprise various types of contents such as slides, photos, audio messages, video clips, text, web pages, images, etc. A *.ppt file created using a PowerPoint™ application is an example of a symbolic presentation file that comprises slides.

The user may print portions of the presentation material on a paper medium to generate paper documents (also referred to as "paper documents") that are usually handed out at the presentation. The term "paper medium" is intended to refer to any tangible medium on which information can be printed. The term "print" or "printing" is intended to include writing, imprinting, drawing, embossing, and the like. Each paper document may comprise one or more paper pages. Depending on the number of people attending the presentation, multiple paper documents may be printed.

An electronic representation of a paper document is received. As shown in FIG. 1, scanner 108 may be used to scan a paper document 110. Various other devices that are capable of scanning information on a paper medium may also be used to scan paper documents. Examples of such devices include facsimile machines, copiers, scanners, and the like.

Various different features may be on a paper document. Generally, the features on a document relate to information to be presented or discussed during the presentation for which the document is created. The features may include portions of presentation material or other material. Examples of features that can be printed include slides, photos, web pages, text information (e.g., a list of agenda features to be discussed at a meeting), and the like. For example, the user may print one or more slides from a *.ppt file on a paper document. The PowerPoint™ application provides tools for printing one or more slides from a *.ppt file to generate a paper document. Each page of the paper document may have one or more slides printed on it. Examples of paper document pages with slides on them are depicted in FIGS. 3A, and 3B and described below in further detail.

The electronic representation may also be an electronic image of paper document. For example, a *.ppt file may be converted to images and used as the electronic representation of the paper document. Although paper document is used, an electronic representation of any document may be received. A document that is printed in paper does not need to be used to generate the electronic representation.

Capture devices 118 are configured to capture information presented at a presentation. Various different types of information output during a presentation may be captured or recorded by capture devices 118 including audio information, video information, images of slides or photos, whiteboard information, text information, and the like. For purposes of this application, the term "presented" is intended to include displayed, output, spoken, etc. For purposes of this application, the term "capture device" is intended to refer to any device, system, apparatus, or application that is configured to capture or record information of one or more types. Examples of capture devices 118 include microphones, video cameras, cameras (both digital and analog), scanners, presentation recorders, screen capture devices (e.g., a whiteboard information capture device), symbolic information capture devices, etc. In addition to capturing the information, capture devices 118 may also be able to capture temporal information associated with the captured information.

A presentation recorder is a device that is able to capture information presented during a presentation, for example, by tapping into and capturing streams of information from an information source. For example, if a computer executing a PowerPoint™ application is used to display slides from a *.ppt file, a presentation recorder may be configured to tap into the video output of the computer and capture keyframes every time a significant difference is detected between displayed video keyframes of the slides. The presentation recorder is also able to capture other types of information such as audio information, video information, slides information stream, etc. The temporal information associated with the captured information indicating when the information was output or captured is then used to synchronize the different types of captured information. Examples of presentation recorders include a screen capture software application, a PowerPoint™ application that allows recording of slides and time elapsed for each slide during a presentation, presentation recorder described in U.S. application Ser. No. 09/728,560, filed Nov. 30, 2000, U.S. application Ser. No. 09/728,453, filed Nov. 30, 2000, and U.S. application Ser. No. 09/521,252, filed Mar. 8, 2000, and are hereby incorporated by reference for all purposes.

A symbolic information capture device is able to capture information stored in symbolic presentation documents that may be output during a presentation. For example, a symbolic information capture device is able to record slides presented at a presentation as a sequence of images (e.g., as JPEGs, BMPs, etc.). A symbolic information capture device may also be configured to extract the text content of the slides. For example, during a PowerPoint™ slide presentation, a symbolic information capture device may record the slides by capturing slide transitions (e.g., by capturing keyboard commands) and then extracting the presentation images based on these transitions. Whiteboard capture devices may include devices such as a camera appropriately positioned to capture contents of the whiteboard, a screen, a chart, etc.

The information captured or recorded by capture devices 118 during a presentation may be stored in a repository or database 115 as recorded information 120. Recorded information 120 may be stored in various formats. For example, a directory may be created in repository 115 for storing recorded information 120, and the various types of information (e.g., audio information, video information, images, etc.) included in recorded information 120 may be stored in the directory. In another embodiment, recorded information 120 may be stored as a file. Various other techniques known to those skilled in the art may also be used for storing the recorded information.

Images of the slides found in the paper document are displayed during a presentation. In one embodiment, a presentation recorder may capture slide images as they are displayed. In addition, association information that may be used to index into recorded information 120 may be stored. For example, time information may be stored indicating a time that the slide was displayed. The time information may then be used to determine portions of recorded information 120 that correspond to when the slide was displayed.

In addition to the time information, source information identifying the location where the recorded information for the presentation is stored may also be determined. This storage location information for recorded information 120 may be updated when the recorded information is moved to a new storage location. In this manner, embodiments of the present invention allow the storage location of recorded information 120 to be changed over time.

According to an embodiment of the present invention, the association information is stored in the XML structure. For example, the association information may include time information and source information for presentations and/or pages determined in step 206. The source information may be an identifier used to access a presentation. For example, the source information may be a location and file name. The time information is then used to index into a portion of a presentation. The presentation may have been a presentation determined in step 204 or a presentation that is related to information determined in step 204 (e.g., a presentation from which slide images were captured using a presentation recorder). The portion of the presentation may include information that matches the extracted features determined in step 204. For example, the portion of the presentation may include a slide that was displayed during the presentation.

Server 112 creates a composite electronic representation 122. In one embodiment, features are extracted from an electronic representation of a paper document received. The features are compared to recorded information 120 to determine matching information. In one embodiment, matching information may be determined using various techniques. It will be recognized that a slide image may not have to match a slide image exactly. For example, text in a slide may be compared with text to determine text that substantially matches.

Information to insert is then determined based on the matching information and the electronic representation of the paper document. Composite electronic representation 122 is then created based on the information inserted. Composite electronic representation 122 may include the features extracted. Also, composite electronic representation 122 may include the information determined based on the matching information and the electronic representation of the paper document.

A user may select the inserted information in composite electronic representation 122 and have recorded information 120 accessed and/or played. For example, an electronic representation of a slide in the paper document may be used to determine information that is related to recorded information 120. The inserted information may include an object showing a picture of a portion of a presentation. When the object is selected, recorded information 120 when the slide was displayed during the presentation is accessed and/or played. Thus, when a user desires additional information related to a slide in the paper document, the inserted information in composite electronic representation 122 may be used to retrieve recorded information 120 of the presentation when the slide was displayed and/or discussed.

Figure 2:
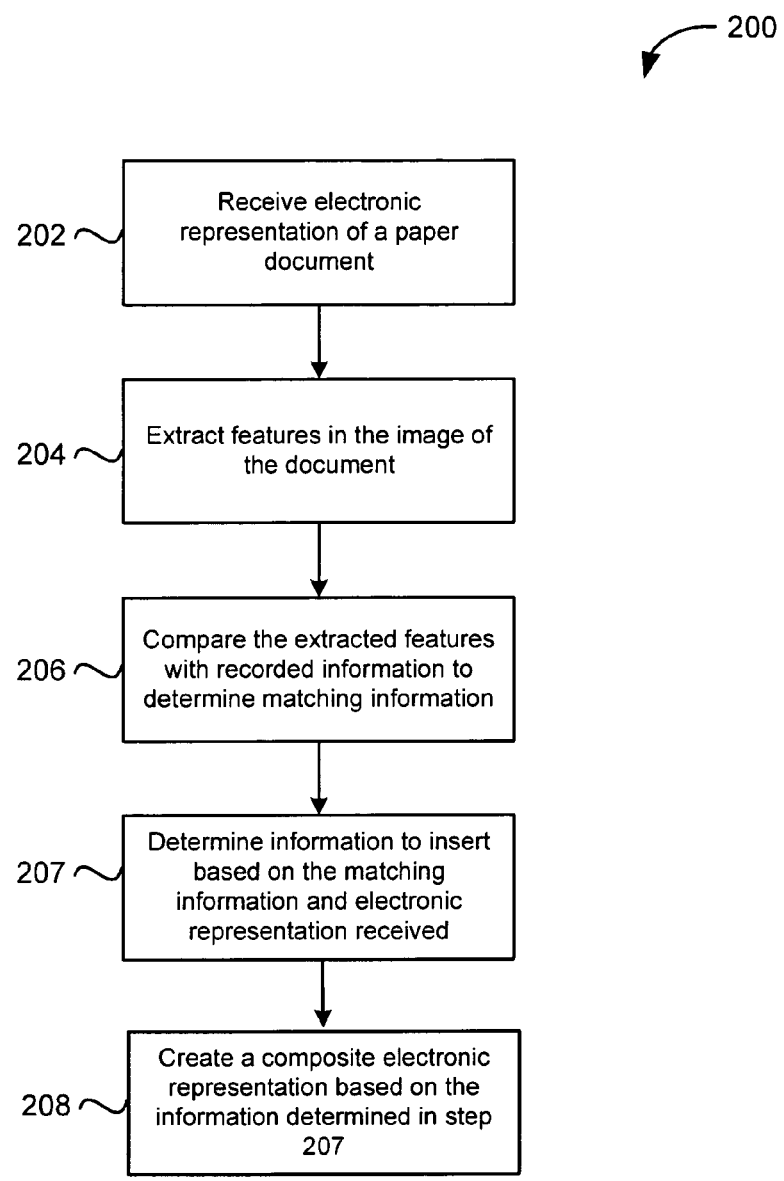
FIG. 2 depicts a simplified flowchart of a method for using an electronic representation of a paper document to create an electronic representation with inserted information related to recorded information according to one embodiment of the present invention.

FIG. 2 depicts a simplified flowchart 200 of a method for a composite electronic representation 122 according to one embodiment of the present invention. The method depicted in FIG. 2 may be performed by software modules executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention.

In step 202, an electronic representation of a document is received. In one embodiment, the document was printed as a paper document. The user may have taken notes on the paper document. The notes may be typically written on a paper document for a presentation. Other ways of taking notes may be appreciated also, such as typing in notes on an electronic version of the document. Although notes may be written on the paper document, it is not necessary that any notes be present.

Although an electronic representation of a paper document will be assumed as received, it will be understood that an electronic copy of a document may be received. One or more pages in the paper document may be received as the electronic representation. For discussion purposes, it is assumed that the electronic representation includes a single page but it should be understood that the electronic representation may include any number of pages. As discussed above, an electronic representation of a paper document may be received from a document that is scanned.

In another embodiment, an electronic version of the paper document may be used. For example, the electronic version may be images of slides found in a *.ppt file. A *.ppt file may be converted to images. For example, techniques are known where *.ppt slides may be converted into images in a .pdf or flash file. These images may be used as images of a document. For example, an electronic representation of a document may be received using the following process. A user may open the electronic representation in an application, such as a pdf reader. For example, the electronic representation from the scanned document or the electronic version may be opened in the application. An input may be provided in the pdf reader that initiates the following steps.

In step 204, features are extracted from the electronic representation of the document. The document may include images of one or more slides that were presented in the presentation. The images of the slides are then extracted from the electronic representation of the document. Although the processing is described as extracting slides, it will be understood that other features may be extracted. For example, pictures, text, etc. may be extracted. For example, instead of using slides in a presentation, the user may display pictures of certain features. The pictures are then extracted.

In one embodiment, segmentation may be used if more than one slide is present on a page. Segmentation separates and determines separate slides on the electronic representation of the paper document. This may be desirable when the individual slides should be associated with different portions of recorded information 120. Segmentation may not be required in some cases, such as when only one slide is on a page, etc.

Techniques for segmenting documents and images are well known in the art. Many of the current segmentation techniques may be used for segmenting individual slide regions from an electronic representation of a paper document. An example of segmentation techniques will be described below in more detail. Although segmentation is described, it should be understood that other techniques may be used to determine slide images in an electronic representation of a paper document. For example, the content of an electronic representation may be analyzed to determine slide images. In one example, a rectangular box may be recognized and the information in the box may be used as a slide image.

In step 206, extracted features are compared with recorded information 120 to determine matching information in recorded information 120. For example, portions of recorded information 120 that match the extracted features may be determined. The portions may include, pages of a presentation, video, audio, etc. In one embodiment, slide images extracted from the electronic representation of the document are compared to slide images in recorded information 120 for different presentations. Recorded information 120 for the presentations may have been presented at different times and thus all include matching information (e.g., one slide may occur in different recorded information for presentations).

In one embodiment, the extracted features may include a plurality of slides. The slides may be compared to slide images to determine a presentation that includes matching information. In one embodiment, each slide in the plurality of slides is compared to slides in recorded information 120 for presentations. Portions of recorded information 120 that include information that match the slides are determined.

In another embodiment, the plurality of slides are treated as a set and all slides are used in comparing slides in all presentations. Thus, in order for a presentation to be identified to include matching information, the presentation should include slides that match each of the plurality of slides taken as a set.

Various techniques may be used to determine matching information in recorded information 120. In one embodiment, techniques described in U.S. application Ser. No. 10/412,757, entitled "AUTOMATED TECHNIQUES FOR COMPARING CONTENTS OF IMAGES", filed Apr. 11, 2003; U.S. application Ser. No. 10/660,985, entitled "TECHNIQUES FOR STORING MULTIMEDIA INFORMATION WITH SOURCE DOCUMENTS", filed Sep. 12, 2003; U.S. application Ser. No. 10/661,052, entitled "TECHNIQUES FOR PERFORMING OPERATIONS ON A SOURCE SYMBOLIC DOCUMENT", filed Sep. 12, 2003; U.S. application Ser. No. 10/660,867, entitled "TECHNIQUES FOR ACCESSING INFORMATION CAPTURED DURING A PRESENTATION USING A PAPER DOCUMENT FOR THE PRESENTATION", filed Sep. 12, 2003; U.S. application Ser. No. 10/696,735, entitled "TECHNIQUES FOR USING A CAPTURED ELECTRONIC REPRESENTATION FOR THE RETRIEVAL OF RECORDED INFORMATION", filed Sep. 12, 2003 and other techniques known to those skilled in the art may be used to find matching images (i.e., images from the recorded information that comprise the extracted features).

In one embodiment, the extracted features may be used to determine recorded information 120 for presentations that include information that match the extracted features. For example, this is done by first extracting images from recorded information 120. The images that are extracted from recorded information 120 may include images captured during the presentation by various electronic representation capture devices, images captured by a presentation recorder, keyframe images obtained from video information captured during the presentation, and the like.

The extracted images are then compared with the extracted features determined in step 204. The extracted images may have been pre-processed to determine time information indicating the time(s) during the presentation when the slide was displayed or presented. The time information for a slide may also identify one or more spans of time during the presentation when the slide was presented or displayed. The spans of time may be non-contiguous.

In one embodiment, the matching information may be determined using techniques described in the "Matching Techniques" section described below. The matching information may be determined using presentation level matching. A document-matching algorithm receives a document electronic representation Ii as input and it compares that to the database of Presentation Recorder documents. This may be referred to as a presentation-matching step. It locates every presentation recording session that may have been used to give the presentation. The next step, called slide matching, maps each segmented slide electronic representation $p_{j,k}$ in the identified Presentation Recorder sessions onto the slide images on the document. The techniques are described in more detail below. This provides the mapping from each slide in the documents to the source and time stamps in the audio and video tracks.

In step 207, information to insert is determined based on the matching information determined in step 206 and the electronic representation of the paper document received in step 202. In one example, the information determined may be based on slide images that match the extracted features. The association information determined for a matching slide image may be used to index into a presentation. An image extracted from the presentation recording at the time indicated by the association information may then be determined.

In step 208, a composite electronic representation 122 is created with the information determined in step 207. Composite electronic representation may include many types of information. For example, the features extracted may be included in composite electronic representation 122.

Also, the information may include metadata that is determined based on recorded information 120. The metadata may be derived from the matching information determined in step 206. For example, metadata may also be determined and inserted in the created electronic representation. Recorded information 120 may be post processed to extract metadata to be included in composite electronic representation 122 (created using documents as templates). For example, how long a slide was discussed may be calculated and inserted. It should be understood that there is no limit on what kind of metadata is extracted or in what form they can be included in composite electronic representation 122, some examples for extraction of metadata are provided for illustrative purposes. Techniques for determining metadata will be described in more detail below.

Also, a selectable object, such as an icon or a link, may be inserted. When selected, the object uses association information that is related to the matching information determined in step 206 to access recorded information 120. For example, the accessed information may be a presentation recording at a time when a slide was displayed. Thus, an image extracted from recorded information 120, when selected, may cause the presentation recorded to be accessed at a time specified by association information for the image. In another embodiment, recorded information 120 may be embedded or stored with the image. When an object is selected, the embedded information is accessed and played. Thus, a central database may not need to be accessed. For example, a video player object may be embedded in the image. When play is selected, recorded information 120 is automatically played.

In one embodiment, the electronic representation received in step 202 is used to create composite electronic representation 122. For example, information is inserted into the electronic representation received. Also, a new document may be created that includes the electronic representation received and the inserted information. In both cases, composite electronic representation 122 is created with information relating to recorded information 120 inserted into it. For example, a paper document may be printed and handed out for a presentation. A user may take notes on the paper document. The paper document is then scanned to generate an electronic representation of the paper document. Information is then inserted in the scanned electronic representation.

In another embodiment, a document that is different from the electronic representation received is created. A different document may include the features extracted in step 204 and the inserted information. For example, just the extracted images of slides in a paper document and the determined information may be included in composite electronic representation 122.

Composite electronic representation 122 created in step 210 may then be emailed, reprinted, stored on a server for later access, copied to storage medium, such as a CD, display, etc. When a user needs to review that particular presentation, the user can review the notes taken in composite electronic representation 122 (assuming that composite electronic representation 122 included the notes of the paper document). If more information is needed, the information inserted in composite electronic representation 122 may be selected and recorded information 120 corresponding to association information for the inserted information may be accessed and displayed. For example, a presentation playback interface may be invoked and playback starts from a time stored in the association information. In other embodiments, the inserted information may be used to add information to composite electronic representation 122. For example, metadata may indicate how long the slide was discussed.

Figure 3:
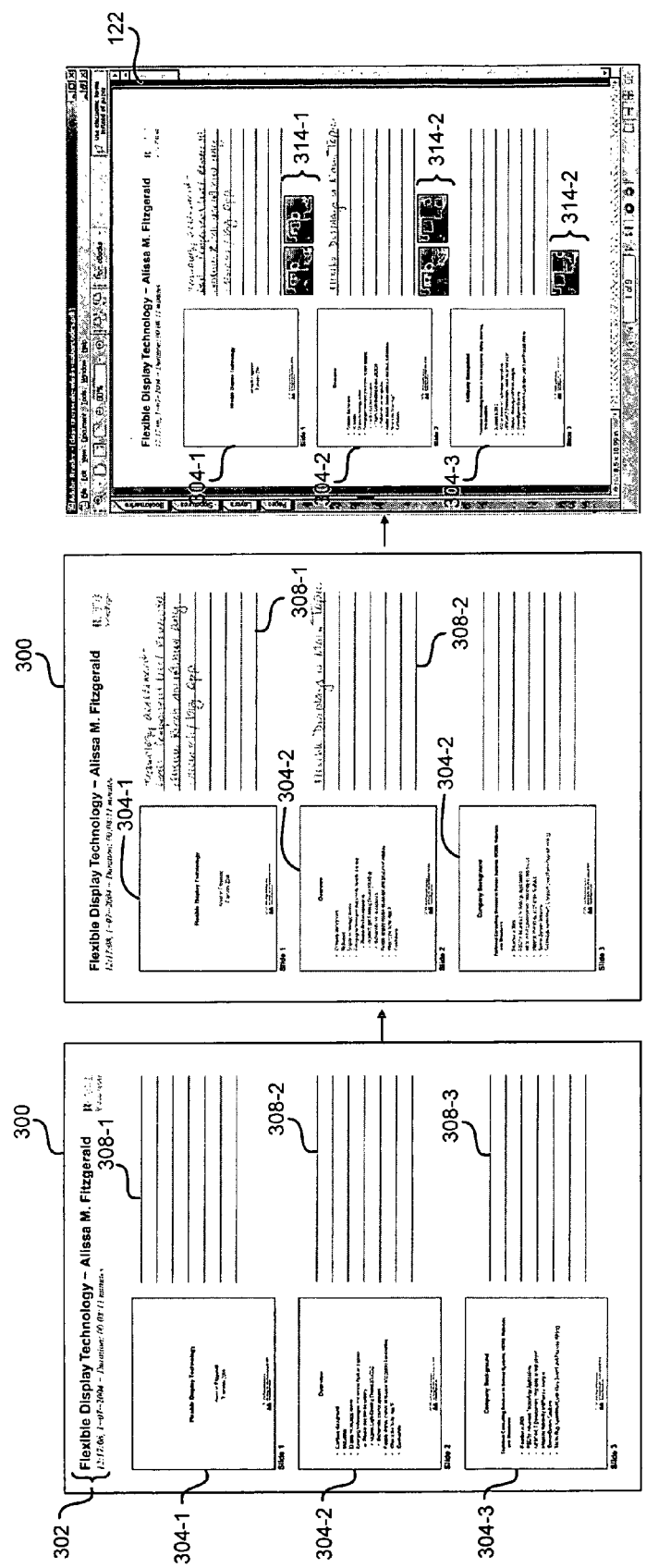
FIG. 3A depicts a page of a paper document according to one embodiment of the present invention.
FIG. 3B depicts the page of FIG. 3A with user markings according to one embodiment of the present invention.
FIG. 3C depicts an interface that includes information inserted that is related to recorded information according to one embodiment of the present invention.

FIG. 3A depicts a simplified page 300 from a paper document generated according to embodiments of the present invention. Page 300 depicted in FIG. 3 is merely illustrative of an embodiment incorporating the present invention and does not limit the scope of the invention as recited in the claims. One of ordinary skill in the art would recognize other variations, modifications, and alternatives.

As shown in FIG. 3A, information 302 identifying the presentation and the presenter is printed on page 300. Other information such as the time when the presentation takes place, the duration of the presentation, etc. may also be included in information 302. In the embodiment depicted in FIG. 3A, three slides (features) 304-1, 304-2, and 304-3 are printed on page 300. Additionally, spaces 308 are provided for a user to take notes during the presentation for each slide.

FIG. 3B depicts page 300 of FIG. 3A with user markings according to embodiments of the present invention. As shown, a user has written notes on the document in spaces 308-1 and 308-2.

FIG. 3C depicts a composite electronic representation 122 according to one embodiment of the present invention. Composite electronic representation 122 may be viewed using an interface, such as a pdf reader, web browser, word processing interface, etc. Composite electronic representation 122 includes information inserted that is related to recorded information 120 according to one embodiment of the present invention. As shown in interface 310, composite electronic representation 122 that includes at least a portion of page 300. Composite image in FIG. 3C may be created using page 300 as a base. Other information may be superimposed on composite image.

Composite electronic representation 122 also includes information 314. As shown, images of recorded information 120 are included in information 314. The images, in one embodiment, correspond to a portion in recorded information 120 for a presentation. The portion may be when a slide that matches a slide 304 was outputted. For example, information 314-1 includes information extracted from recorded information 120 where an image of slide 304-1 was outputted.

In one embodiment, information 314, when selected, may cause an action to be performed. Each image in information 314 may be associated with association information, such as time and source information, that is used to access recorded information 120. Although not shown, information 314 may also include information other than images, such as hypertext links, icons, metadata, etc.

Composite electronic representation 122 may include the received electronic representation of paper document 300. In this case, information 314 is inserted into the scanned electronic representation. Thus, a user that took notes on a paper document may view the paper document with the notes in addition to the inserted information 314. In one example, an electronic representation of a user's paper document becomes a template for a media document that includes the inserted information 314. Thus, a user may view the media document and, if more information is desired, the inserted information may be selected and related recorded information 120 may be accessed and viewed.

Also, composite electronic representation 122 may be a different document than the received electronic representation. The different document may include any or all of the features from the electronic representation received. For example, a user may desire a different format than the electronic representation of the paper document. The slide images or notes in the electronic representation of the paper document may be removed or moved to a different location on the page. For example, composite electronic representation 122 with just the user's notes and inserted information 314 may be generated.

Composite electronic representation 122 may be stored in various formats. For example, composite electronic representation 122 may be a PDF, HyperText Transfer Language (HTML), Flash, MS Word, etc. formatted document. In one embodiment, the format supports the insertion of information that may be used to link to recorded information 120.

As described above, features extracted are used to determine matching information. In alternative embodiments, other types of information may be used to determine matching information. For example, bar codes found on a paper document may be used to determine portions of recorded information 120. For example, in one embodiment, documents may be printed with barcodes associated with each slide. The bar codes may be used to make the link between the slides and the recorded information. For example, techniques described in U.S. application Ser. No. 10/660,867, entitled "TECHNIQUES FOR ACCESSING INFORMATION CAP- TURED DURING A PRESENTATION USING A PAPER DOCUMENT FOR THE PRESENTATION", filed Sep. 12, 2003.

In another embodiment, barcodes, or some other markings may be used to represent signature information of each slide. This signature information may include the text from the slide, image feature vectors, etc. The signature is generated at the time of generating the document (e.g., during printing). The signature may also include information regarding the location on the document where the information related to recorded information 120 may be inserted. After the document image is captured (e.g., after scanning), these printed markings are identified (extracted & decoded) and used for matching, accessing, and inserting the information related to recorded information 120.

Figure 4:
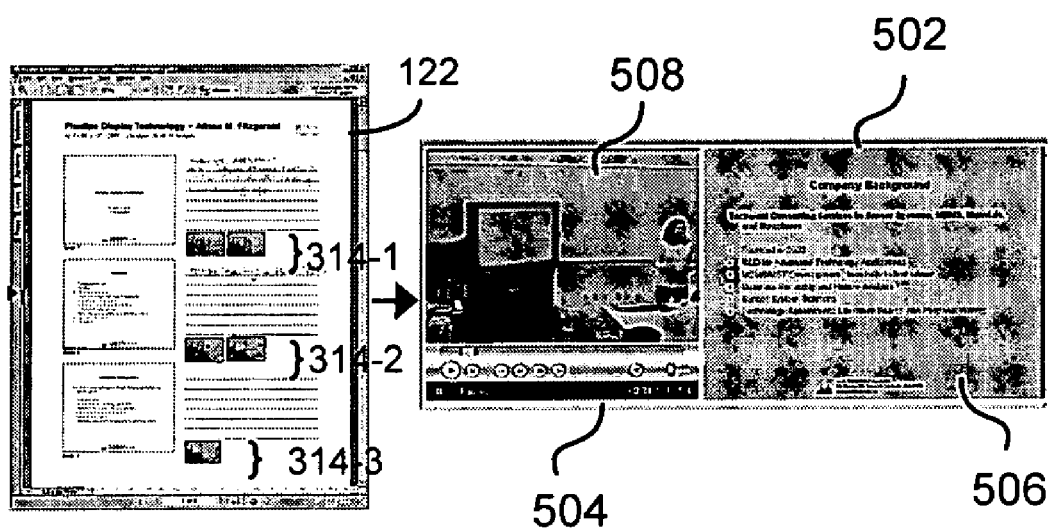
FIG. 4 depicts a possible output after information is selected according to one embodiment of the present invention.

FIG. 4 depicts a possible output after information 314 is selected according to one embodiment of the present invention. Information 314 includes an image but it should be understood that information other than an image may be selected, such as an icons, links, text, pictures, video, audio, etc.

As shown, an interface 502 may be displayed when an image in information 314 is selected. Interface 502 includes a window 504 that displays recorded information 120 and a window 506 that includes an image of a slide 304. For discussion purposes, it assumed that a user has selected an image in information 314-3. After the selection, association information for the image is used to access recorded information 120. For example, the association information may be source and time information. The source information may used to access a presentation and the time information is used to determine a portion of the presentation at the time. For example, the time information may be a start time where a slide 304-3 was displayed.

Window 504 includes a media player and may be used to display a portion of accessed recorded information 120. As shown, recorded information 120 is displayed in a media player window 508. In this case, a starting image corresponds to the image displayed in information 314-3. A user then may select play in the media player and portions of the presentation are played. Alternatively, the accessed recorded information 120 may be automatically played.

An image of slide 304-3 may also be displayed in window 506. Also, the original slide in the *.ppt file may be displayed in window 506. Thus, a user may watch a presentation in window 504 in addition to viewing slide 304-3. Accordingly, a user may not need to view the paper copies of the document. Also, window 506 may include other information, such as the notes that a user took as shown in FIG. 3B. Additionally, metadata that is determined may also be displayed in window 506.

Figure 5:
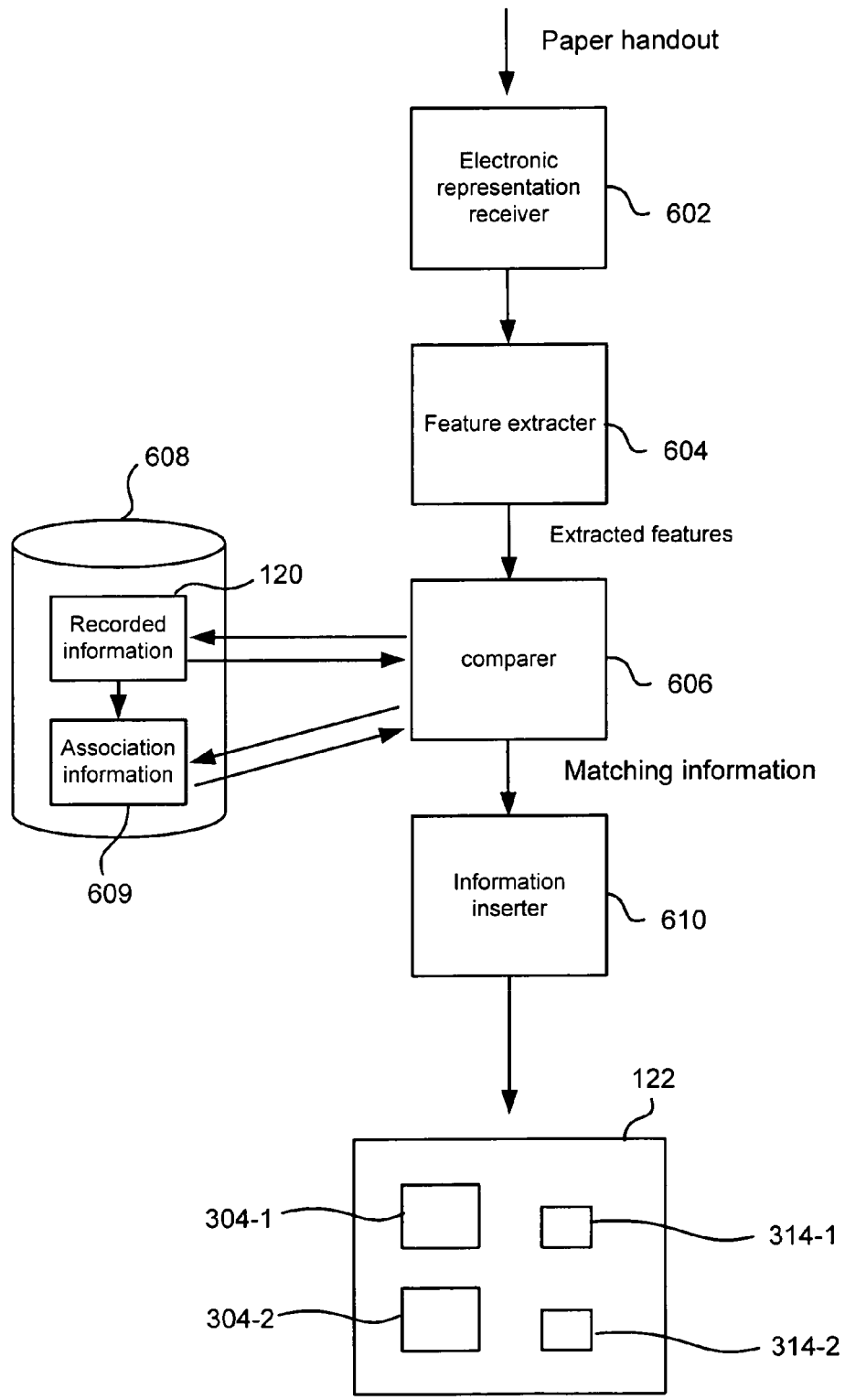
FIG. 5 is a simplified block diagram of modules that may be used to implement an embodiment of the present invention.

FIG. 5 is a simplified block diagram 600 of modules that may be used to implement an embodiment of the present invention. The modules may be implemented in software or hardware, or combinations thereof. The modules depicted in FIG. 5 are merely illustrative of an embodiment incorporating the present invention and do not limit the scope of the invention as recited in the claims. One of ordinary skill in the art would recognize other variations, modifications, and alternatives.

An electronic representation receiver 602 receives an electronic representation of a paper document. In one embodiment, the electronic representation may be received from a scanner that scanned a paper document to generate the image. Also, an electronic copy of a paper document may be received.

A feature extracter 604 receives the electronic representation and is configured to extract features from the image. For example, slide images are extracted from the electronic representation of the paper document. As discussed above, various techniques may be used to determine individual slide images.

A comparer 606 receives the extracted features and is configured to determine matching information for the extracted features. In one embodiment, a database 608 that stores recorded information 120 and association information 609 is queried. The extracted features are compared to recorded information 120 to determine matching information. Association information for the matching information in recorded information 120 may be determined also. The association information may be used to access portions of presentations.

An information inserter 610 receives the matching information, association information, and image. Also, recorded information 120 (e.g., audio and video information), metadata, etc. may be received. Information inserter 610 is configured to determine information to insert and to generate a composite electronic representation 122, as described above. For example, information 314 related to the matching information in recorded information 120 is inserted in composite electronic representation 122. Information 314 may also be associated with the association information. In this case, when the inserted information 314 is selected, the association information may be used to access portions of recorded information 120. Also, recorded information 120 (e.g., audio and video information), metadata, etc. may be inserted into electronic representation 310. Thus, database 608 does not need to be accessed when recorded information 120 is played.

Applications:

I. Play Program

Although embodiments of the present invention have been described using presentation recordings, it will be recognized that embodiments described may be used with recorded information other than presentation recordings. A paper document may be various forms including any medium that includes recognizable features you can extract. For example, a paper document may be a program of a play. Before a play in a theater starts, the program of the play is distributed to the audience. The program may include some scenes from the play, images of actors, or some text from the play. The play is then recorded. After the play, composite electronic representation 122 of the play program is received. For example, a user may scan or capture the play program with their digital camera. Using processing described above, composite electronic representation 122 includes information related to the recorded play. The processing may include comparing the play scenes in the program to the captured video frames of the recorded play, comparing the actor's pictures in the program to the face recognition results from the play recording, and comparing the text in the program to the captured audio (speech recognition) to determine matching information.

Information related to the matching information may then be inserted into composite electronic image. Composite electronic representation 122 of the play program may have objects inserted that are associated with portions of the play. A user may store composite electronic representation 122 in their digital camera. Alternatively, composite electronic representation 122 may be e-mailed to the user or to others for sharing purposes. Accordingly, when a user is interested in a feature in the program, the inserted information may be selected and a portion of the recorded play may be accessed and played in one example.

II. Symphony

Another application example is as follows, before a symphony practice takes place, music notes are printed and distributed to the players as paper documents. During the symphony, music is recorded, and players may take notes on the documents. After the practice, electronic representations of the documents are received. An association between the recorded audio is determined by OCR'ing the captured music notes and automatically extracting notes from the audio and matching them. The user then may receive composite electronic representation 122, such as a PDF document, that contains the scanned music notes, the personal notes, and inserted information that associates the information to the audio recorded during the practice (or audio played by another symphony). Composite electronic representation 122 may also be helpful to another person for practicing who may have missed the original practice.

Techniques for performing segmentation, techniques for matching, and techniques for determining metadata will now be described.

Segmentation

Embodiments of the present invention may segment an electronic representation of a paper document using the following process. Horizontal and vertical protections of an electronic representation are first obtained. It should be noted that some pre-processing of the electronic representation may be required before this step, such as skew correction, down sampling, smearing, connecting component analysis, etc.

The distance between extracted projections to the projections obtained from a set of document templates is computed. FIG. 6 depicts possible templates that may be included in the set of document templates. Document templates 702 include possible layouts that may have been used to create the pages. The layouts include different images. For example, documents 702-1 and 702-2 include layouts for slide images. Document template 702-1 includes two columns of slide images 704. Document template 702-2 includes a single column of slide images 706. Document template 702-3 also includes a left column that includes three slide images 708 and a right column that includes three areas 710 where a user may enter notes. The extracted projection is then compared to document templates 702. In one embodiment, these templates are used to create paper documents. For example, the images shown do not have to be images of slides. Rather, windows that indicate a slide should be placed in certain locations where the slide images are shown in FIG. 6 may be used.

The document template 702 that has a minimum distance to the document image is then determined. For example, a page that includes three slide images in a left column and a space for notes in the right column may substantially match document template 702-3.

The document image is then segmented into rectangular regions using the slide placement information of a matched document template 702. For example, because the slides are located in the left column with a certain spacing, the document may be segmented into portions that include individual portions that include a slide.

Matching Techniques

In one embodiment, the following techniques may be used to determine association information using the electronic representation of the document and presentation recording document. A document-matching algorithm receives an image Ii as input and it compares that to the database of recorded Presentation recorder documents. This may be referred to as a presentation-matching step. It locates every presentation recorder document that could have been captured during the presentation where the slides in the document are presented. The next step, called slide matching, maps each slide image in the segmented document image onto the slide images captured by the Presentation Recorder in one presentation session.

The presentation-matching algorithm applies OCR to the Presentation Recorder document and it saves the text it outputs together with an indication of the page that the text occurred on. An issue is the presence of potentially a large number of both duplicate and spurious images in the Presentation Recorder document caused by people going back and forth in their PowerPoint file while they give a talk, the use of custom animations that cause only minor differences to occur in the captured images, and the use of video clips that can cause the Presentation Recorder to capture hundreds of frames. A pseudo code statement according to one embodiment of the presentation-matching algorithm is shown below.

```
for every slide s in Document Ii
    for every word n-gram w in s
        for every Presentation recorder document Pj containing w
            add Pj to the solution set ss
            ++ score {Pj}
end
for each Presentation Recorder document Pj in ss
    if (score {Pj}/num_words {Pj}>t1 &&
    % pages in Pj with >t2 n-grams in Ii>t3)
    then return (Pj);
end
```

The first step looks up all the Presentation Recorder files that contain each word n-gram in the Document Ii and increments a score for that document. The second step considers the Presentation Recorder files with a minimum percentage of their words in Ii, as specified by t1, and determines the percentage of pages with more than t2 of their n-grams in Ii. If this exceeds t3, then we say this Pj is the matching Presentation Recorder document.

The presentation-matching algorithm is tolerant of OCR errors in the Presentation Recorder document. Since it contains color jpeg images, we expected the OCR would make many mistakes. However, because presenters typically choose fonts carefully and use short text phrases, errors may not be a significant problem. Also, the requirement that a percentage of the pages in the Presentation Recorder file be contained in the Document takes into account duplicate and spurious images. These factors let thresholds be set liberally.

An additional consideration in the design of the presentation-matching algorithm was the use of existing full text indexes. This was achieved by using word n-grams as query terms to propose potentially matching PowerPoint files. This is supported by almost every full text index, e.g., Google.

The slide-matching algorithm determines images in the Document I, that match each slide in the Presentation Recorder files located by the presentation-matching algorithm. It uses a combination of string matching on the OCR results for the images that contain text, and edge histogram matching for images that do not contain text. Examples of slide matching techniques are described in more detail in U.S. application Ser. No. 10/412,757, entitled "AUTOMATED TECHNIQUES FOR COMPARING CONTENTS OF IMAGES", filed Apr. 11, 2003.

Metadata

Text and Keywords

Text is extracted from each captured screen image. Test localization and binarization of each electronic representation is achieved with a scheme that uses not only the luminance component of a captured image, but also its color components. This is because, unlike common document images, background/foreground contrast in a slide electronic representation may be obtained by color contrast as well as luminance contrast. Details of this scheme are described in U.S. application Ser. No. 10/412,757, entitled "AUTOMATED TECHNIQUES FOR COMPARING CONTENTS OF IMAGES", filed Apr. 11, 2003. A commercial OCR package may be used to extract text from the binarized text regions. Extracted text is indexed in XML format with the captured image and line number. Keywords are found by TF-IDF analysis performed on the text extracted from all the screen captured images for a presentation session.

Electronic Representation Features

A number of image feature vectors, i.e., edge histogram and color layout [ID-RII-311], are computed for the screen capture images. These features are later employed for duplicate slide detection and linking screen images to the original presentation slides.

Symbolic Presentation Slides

Presenters can submit the original presentation document to the server prior to their talk. After the submission, presentation file is assigned an ID, $ID_k$, and text and slide titles are extracted from each slide by parsing the presentation file. A rendered JPEG electronic representation of the slide, $S_i$, is extracted and used to compute the edge histogram and color layout feature vectors. Presentation file, JPEG images, text, titles, and feature vectors are indexed and placed to a directory of unresolved presentations.

After each presentation session finishes, image features and text extracted from the screen capture images are matched with the image features and text extracted from the unresolved presentation files. When there is a match found, the file is removed from the directory of unresolved presentations and linked to the recorded presentation. After presentation level matching, electronic representation and text features are used to match each presentation slide, $S_i$, to a set of screen capture images, $\{C_j, \ldots, C_n\}$. The electronic representation matching process is 98% accurate.

Key Frame Extraction

Figure 7:
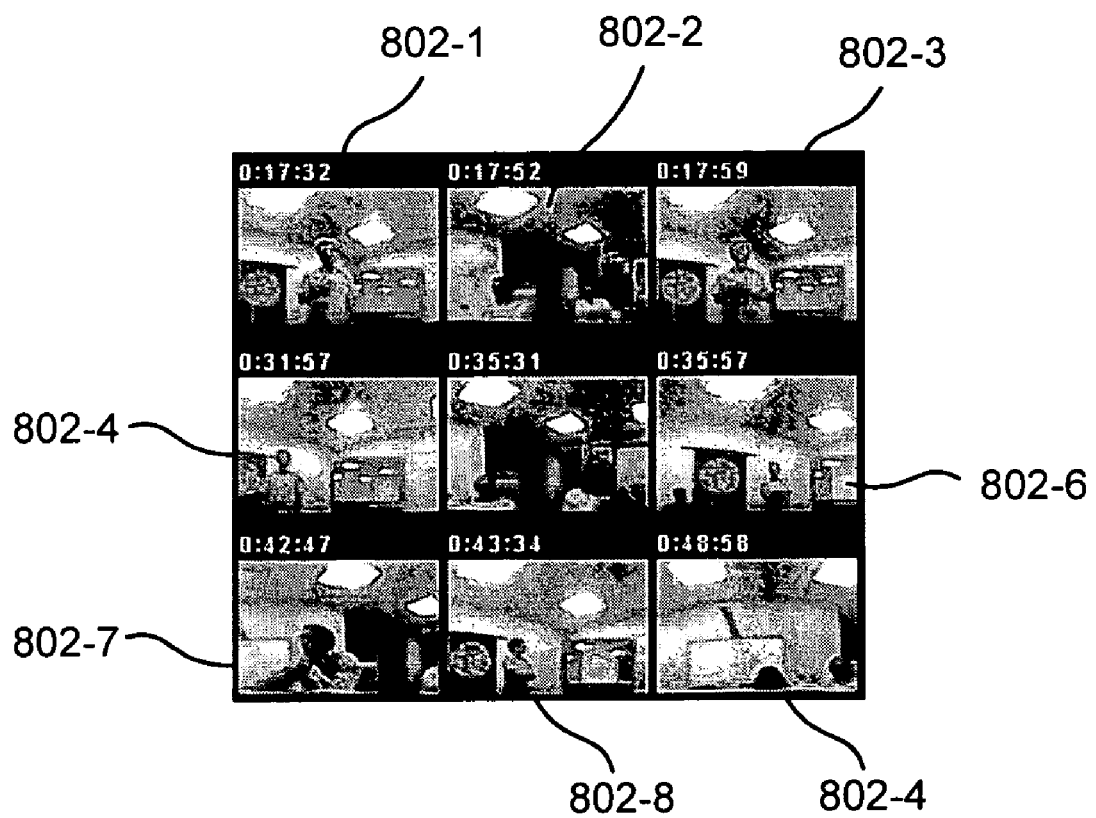
FIG. 7 depicts keyframes according to one embodiment of the present invention.

The conference room is equipped with 2 cameras, a Pan-Zoom-Tilt camera and an omni-directional camera with 360° capture. The PTZ camera focuses on either the presenter or the entire conference room. PTZ camera location is controlled by the meeting room portal and each time the camera location changes a keyframe is extracted from the video sequence. The omni-directional camera is placed in the middle of the conference room and captures a panoramic view of the room. Four microphones are attached to the camera and sound source localization (SSL) is performed real-time on the 4 channel audio. Each time the sound source changes direction, a key frame showing only a perspective view from the direction of the sound is extracted from the panoramic video. FIG. 7 shows these key frames 802, which are very useful when navigating meeting/presentation recordings as they coincide with speaker changes. All the extracted key frames are indexed with their source and timestamps.

Time Spent on Each Slide

The amount of time spend on a presentation slide, $sT_i$, can be a good indicator of the importance of that particular slide and computed as $$sT_i = \frac{1}{pT} \sum_{C_n \approx S_i} T(C_{n+1}) - T(C_n),$$

where pT is the total presentation time, $S_i$ is the presentation slide, $C_n$ is the $n^{th}$ captured screen electronic representation matching $S_i$, $T(C_n)$ is the timestamp of $C_n$ in seconds.

Question & Answer Activity

The amount of discussions, questions, comments around a particular presentation slide can be an indication of the interest around the topic it discusses. On the other hand, segmentation of speakers, Q&A sessions, are quite challenging and often require prior training of the speaker segmentation systems. Our approach for identifying audio segments with Q&A activity is somewhat different. It is based ion SSL and works quite robustly in practice. Our experiments showed that during a presentation, 93% of the time the speaker stays in the same 20 degree azimuth (region) of the SSL device. Clearly, the azimuth range could change based on the conference room setup. Nevertheless, for most conference room setups, it is often a reasonable assumption to make that the presenter has a limited platform to move around. Let's indicate this range of this platform wrt the SSL with $[\alpha_{s1}\ \alpha_{s2}]$. Assuming that there is no audience between the presenter and the SSL device, sound coming from the direction other than the presenter can be interpreted as a comment or a question from an audience member. The question and answer activity for a given presentation slide Si is defined as the number of times the sound source change directions between the audience and the presenter as follows:

$$sQA_i = \frac{1}{pD} \sum_{C_n \approx S_i} \sum_{t=T(C_n)}^{T(C_{n+1})-1} |D(t) - D(t+1)|,$$

where $C_n$ is the $n^{th}$ captured screen image matching $S_i$, $T(C_n)$ is the timestamp of $C_n$ in seconds, pD is the QA activity for the whole presentation, i.e., $$pD = \sum_{t=0}^{pT} |D(t) - D(t+1)|,$$

pT is the total presentation time, and D(t) function is defined as $$D(t) = \begin{cases} \alpha_{s1} \le SSL(t) \le \alpha_{s2} & 1 \\ ow & 0 \end{cases},$$

where SSL(t) is the azimuth of sound direction at t.

Notes Activity

The amount of note taking activity takes place around certain topics in a seminar is most of the time directly relevant to the interest of the audience to that topic. A notes activity measure is computed as follows:

$$sN_i = \frac{1}{\eta(0,\,pT)} \sum_{C_n \approx S_i} \eta(T(C_n),\, T(C_{n+1})),$$

where $n(t_1, t_2)$ returns the number of note entries associated with the [t1 t2] timeframe. It is important to note that the electronic note taking interface allows the association of notes with the current time as well as with the past times and the $\eta$ function returns the note entries based on the associated time rather than the entry time.

Figure 8:
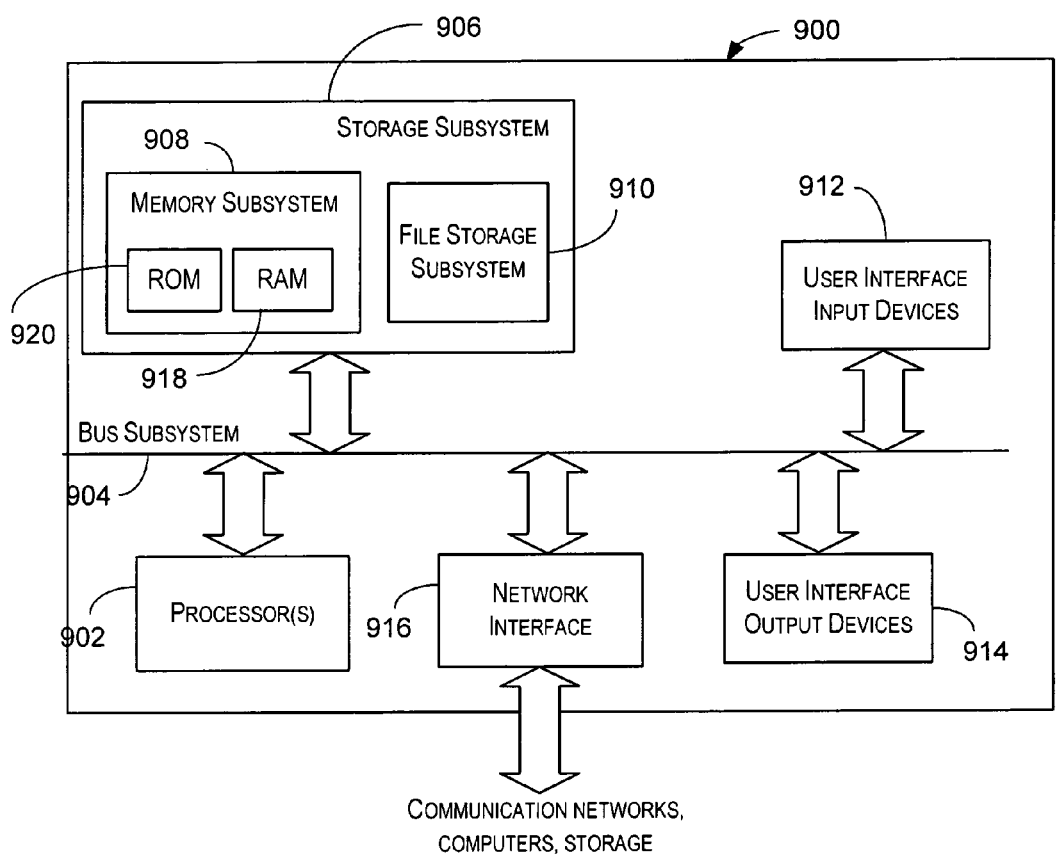
FIG. 8 is a simplified block diagram of data processing system that may be used to perform processing according to an embodiment of the present invention.

FIG. 8 is a simplified block diagram of data processing system 900 that may be used to perform processing according to an embodiment of the present invention. As shown in FIG. 8, data processing system 900 includes at least one processor 902, which communicates with a number of peripheral devices via a bus subsystem 904. These peripheral devices may include a storage subsystem 906, comprising a memory subsystem 908 and a file storage subsystem 910, user interface input devices 912, user interface output devices 914, and a network interface subsystem 916. The input and output devices allow user interaction with data processing system 902.

Network interface subsystem 916 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 916 serves as an interface for receiving data from other sources and for transmitting data to other sources from data processing system 900. For example, data processing system 900 may access stored recorded information for a presentation and XML data structures via network interface subsystem 916. Embodiments of network interface subsystem 916 include an Ethernet card, a modem (telephone, satellite, cable, ISDN, etc.), (asynchronous) digital subscriber line (DSL) units, and the like.

User interface input devices 912 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 900.

User interface output devices 914 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 900.

Storage subsystem 906 may be configured to store the basic programming and data constructs that provide the functionality of the present invention. For example, according to an embodiment of the present invention, software modules implementing the functionality of the present invention may be stored in storage subsystem 906. These software modules may be executed by processor(s) 902. Storage subsystem 906 may also provide a repository for storing data used in accordance with the present invention. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 904 provides a mechanism for letting the various components and subsystems of data processing system 902 communicate with each other as intended. Although bus subsystem 904 is shown schematically as a single bus, alternative embodiments of the bus subsystem may utilize multiple busses.

Data processing system 900 can be of varying types including a personal computer, a portable computer, a workstation, a network computer, a mainframe, a kiosk, or any other data processing system. Due to the ever-changing nature of computers and networks, the description of data processing system 900 depicted in FIG. 8 is intended only as a specific example for purposes of illustrating the preferred embodiment of the computer system. Many other configurations having more or fewer components than the system depicted in FIG. 8 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. It should be understood that the equations described above are only illustrative of an embodiment of the present invention and can vary in alternative embodiments of the present invention.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method in a computer system for creating a composite electronic representation including presentation material information, the method comprising:

scanning a paper document to generate an electronic representation of the document, the document including presentation material having text;

extracting a visual feature from the electronic representation of the document, the visual feature corresponding to at least a portion of the presentation material;

accessing recorded information including audio and visual information recorded during a presentation of the presentation material, applying an optical character recognition (OCR) algorithm to the text to produce recognized text, and comparing the recognized text to the audio of the recorded information to determine a portion of the audio of the recorded information that matches the recognized text, and determining matching information for each matching portion of the recorded information and recognized text using a matching algorithm configured to map the recognized text to a portion of any of a plurality of recorded information that includes audio that matches the recognized text;

generating a user selectable object providing a user with access to the portion of the recorded information determined to match the recognized text, and inserting the user selectable object into the electronic representation of the document when the computer system locates a portion of the recorded information determined to match the recognized text, the computer system thus creating a composite electronic representation of the document including the user selectable object and metadata including the matching information, the user selectable object being placed in a position associated with the extracted feature and allowing the user to access the portion of the recorded information as an embedded video link in the user selectable object by selecting the user selectable object, the user-selectable object being able to access the portion of the recorded information using the metadata in the composite document; and storing the composite electronic representation as a PDF, HyperText Transfer Language (HTML), Flash or Word formatted document for access by the user or another user accessing the composite electronic document.

2. The method of claim 1, further comprising determining association information for the recorded information that corresponds to the extracted feature.

3. The method of claim 2, wherein the association information comprises time information and source information for recorded information.

4. The method of claim 2, further comprising associating the association information with the determined additional information in the composite electronic representation.

5. The method of claim 4, further comprising:
receiving a selection of the determined additional information in the composite electronic representation; and
using the association information for the determined additional information to access the recorded information.

6. The method of claim 1, further comprising accessing the recorded information using the determined additional information.

7. The method of claim 6, further comprising displaying the accessed recorded information.

8. The method of claim 7, further comprising playing the accessed information.

9. The method of claim 1, further comprising:
performing at least one of emailing, printing, storing, and copying the created composite electronic representation.

10. The method of claim 1, wherein the received electronic representation of the paper document includes notes taken by a user, wherein the created composite electronic representation includes the notes taken by the user.

11. The method of claim 1, further comprising determining a document that includes the recorded information using the extracted feature.

12. The method of claim 11, further comprising determining a portion of the document that includes the information corresponding to the feature.

13. The method of claim 1, wherein the feature comprises an identifier to a location in the recorded information, wherein the information in the recorded information corresponding to the feature is determined using the identifier.

14. The method of claim 13, wherein the identifier comprises at least one of a barcode and signature information.

15. The method of claim 1, wherein receiving the electronic representation comprises receiving a scan of the document, the document being a paper document.

16. The method of claim 1, wherein receiving the electronic representation comprises determining an electronic image of the document, the document being a paper document.

17. The method of claim 1, wherein receiving the electronic representation comprises receiving the electronic representation in response to an input from a user indicating that the composite electronic representation should be created.

18. The method of claim 1, wherein the document comprises a paper document.

19. A method in a computer system for creating a composite electronic representation of a document using information, having audio content, recorded during a presentation, the method comprising:

scanning a paper document having text to generate an electronic representation of the document for the presentation;

applying an optical character recognition (OCR) algorithm to the text from the electronic representation to generate OCR determined text;

accessing recorded information including audio and visual information recorded during the presentation, and using a matching algorithm to compare the OCR determined text to the audio of the recorded information to determine a portion of the recorded information that matches the OCR determined text, the matching algorithm configured to map the OCR determined text to a portion of any of a plurality of recorded information having audio that matches and generate matching information in response thereto;

generating composite information based on the portion of the recorded information having audio that corresponds to the OCR determined text in the electronic representation of the document;

generating a user selectable object providing a user with access to the portion of the recorded information corresponding to the OCR determined text, and inserting the user selectable object and metadata including the matching information into the electronic representation of the document when the computer system locates a portion of the recorded information corresponding to the OCR determined text, the computer system thus creating a composite electronic representation of the document including the user selectable object and the metadata, the user selectable object being placed in a position associated with the OCR determined text and allowing the user to access the composite information in an application displaying the composite electronic representation or a separate application by selecting the user selectable object, the user-selectable object being able to access the portion of the recorded information using an embedded video link in the user selectable object; and storing the composite electronic representation as a PDF, HyperText Transfer Language (HTML), Flash or Word formatted document for access by the user or another user accessing the composite electronic document.

20. The method of claim 19, further comprising determining association information for the recorded information that corresponds to the OCR determined text.

21. The method of claim 20, wherein the association information comprises time information for the recorded information, the time information indicating a time when information related to the OCR determined text was presented during the presentation.

22. The method of claim 21, further comprising:
using the association information for the determined information in the composite electronic representation to access recorded information for the presentation at a time indicated by the time information.

23. The method of claim 19, further comprising accessing recorded information using the determined composite information.

24. The method of claim 23, further comprising displaying the accessed recorded information.

25. The method of claim 24, further comprising playing the accessed information.

26. The method of claim 19, further comprising performing at least one of emailing, printing, storing, and copying the created composite electronic representation.

27. The method of claim 19, wherein the document comprises a paper document.

28. The method of claim 19, wherein the OCR determined text comprises an identifier to a location in the recorded information, wherein the information in the recorded information that corresponds to the OCR determined text is determined using the identifier.

29. The method of claim 28, wherein the identifier comprises at least one of a barcode and signature information.

30. The method of claim 19, wherein receiving the electronic representation comprises receiving the electronic representation in response to an input from a user indicating that the composite electronic representation should be created.

31. A computer program product stored on a computer-readable medium for creating a composite electronic representation, the computer program product comprising:
code for scanning a paper document having text to generate an electronic representation of the document, the document including presentation material;
code for applying an optical character recognition (OCR) algorithm to the text from the electronic representation of the document to generate OCR determined text, the OCR determined text corresponding to at least a portion of the presentation material;
code for accessing recorded information including of audio and visual information recorded during a presentation of the presentation material, and comparing the OCR determined text to the recorded information to determine a portion of the audio of the recorded information that matches the OCR determined text, and determining matching information for each matching portion of the audio of the recorded information and the OCR determined text using a matching algorithm configured to map the OCR determined text to a portion of any of a plurality of recorded information having audio that matches the OCR determined text;
code for generating a user selectable object providing a user with access to the portion of the recorded information determined to match the OCR determined text, and inserting the user selectable object and metadata including the matching information into the electronic representation of the document when the computer system locates a portion of the audio of the recorded information corresponding to the OCR determined text, the computer system thus creating a composite electronic representation of the document including the user selectable object, the user selectable object being placed in a position associated with the OCR determined text and allowing the user to access the portion of the recorded information in an application displaying the composite electronic representation or a separate application by selecting the user selectable object, the user-selectable object being able to access the portion of the recorded information using an embedded video link in the user selectable object; and
code for storing the composite electronic representation as a PDF, HyperText Transfer Language (HTML), Flash or Word formatted document for access by the user or another user accessing the composite electronic document.

32. The computer program product of claim 31, further comprising code for determining association information for the recorded information that corresponds to the OCR determined text.

33. The computer program product of claim 32, further comprising code for associating the association information with the determined additional information in the composite electronic representation.

34. The computer program product of claim 33, further comprising:
code for receiving a selection of the determined additional information in the composite electronic representation; and
code for using the association information for the determined additional information to access the recorded information.

35. The computer program product of claim 31, further comprising code for accessing the recorded information using the determined additional information.

36. The computer program product of claim 31, further comprising:
code for performing at least one of emailing, printing, storing, displaying, playing, and copying the created composite electronic representation.

37. The computer program product of claim 31, wherein the received electronic representation of the document includes notes taken by a user, wherein the created composite electronic representation includes the notes taken by the user.

38. The computer program product of claim 31, wherein the document comprises a paper document.

39. A computer program product stored on a computer-readable medium for creating a composite electronic representation of a document having text using information recorded during a presentation, the computer program product comprising:
code for scanning a paper document to generate an electronic representation of the document for the presentation, the electronic representation including text;
code for applying an optical character recognition (OCR) algorithm to the text from the electronic representation to generate OCR determined text;
code for accessing recorded information including audio and visual information recorded during the presentation, and using a matching algorithm to compare the OCR determined text to the audio of the recorded information to determine a portion of the recorded information that matches the OCR determined text, the matching algorithm configured to map the OCR determined text to a portion of any of a plurality of recorded information with audio that matches the OCR determined text and generate matching information in response thereto;

code for generating composite information based on the portion of the recorded information that corresponds to the OCR determined text and the electronic representation of the document;

code for generating a user selectable object providing a user with access to the portion of the audio of the recorded information corresponding to the OCR determined text, and inserting the user selectable object and metadata including the matching information into the electronic representation of the document when the computer system locates a portion of the recorded information corresponding to the OCR determined text, the computer system thus creating a composite electronic representation of the document including the user selectable object and the metadata, the user selectable object being placed in a position associated with the text and allowing the user to access the composite information in an application displaying the composite electronic representation or a separate application by selecting the user selectable object, the user-selectable object being able to access the portion of the recorded information using an embedded video link in the user selectable object; and code for storing the composite electronic representation as a PDF, HyperText Transfer Language (HTML), Flash or Word formatted document for access by the user or another user accessing the composite electronic document.

40. The computer program product of claim 39, further comprising code for determining association information for the recorded information that corresponds to the text.

41. The computer program product of claim 40, wherein the association information comprises time information for recorded information, the time information indicating a time when information related to the text was presented during the presentation.

42. The computer program product of claim 41, further comprising:

code for using the association information for the determined composite information in the composite electronic representation to access recorded information for the presentation at a time indicated by the time information.

43. The computer program product of claim 39, further comprising code for performing at least one of emailing, printing, storing, displaying, playing, and copying the created representation.

44. The computer program product of claim 39, wherein the document comprises a paper document.

45. A data processing system for creating a composite electronic representation, the data processing system comprising:

a processor;

a memory coupled to the processor, the memory configured to store a plurality of modules for execution by the processor, the plurality of modules comprising:

logic to scan a paper document to generate an electronic representation of the document, the document including text and presentation material;

logic to apply a optical character recognition (OCR) algorithm to the text from the electronic representation of the document to generate OCR determined text, the OCR determined feature corresponding to at least a portion of the text and presentation material;

logic to access recorded information including audio and visual information recorded during a presentation of the presentation material, and compare the OCR determined text to the recorded information to determine an audio portion of the recorded information that matches the OCR determined text, and determining matching information for each matching portion of the recorded information and OCR determined text using a matching algorithm configured to map the OCR determined text to a portion of any of a plurality of recorded information having audio that matches the OCR determined text;

logic to generate a user selectable object providing a user with access to the portion of the recorded information corresponding to determined to match the OCR determined text, and inserting the user selectable object and metadata including the matching information into the electronic representation of the document when the computer system locates a portion of the recorded information corresponding to the OCR determined text, the computer system thus creating a composite electronic representation of the document including the user selectable object, the user selectable object being placed in a position associated with the OCR determined text and allowing the user to access the portion of the recorded information in an application displaying the composite electronic representation or a separate application by selecting the user selectable object, the user-selectable object being able to access the portion of the recorded information using an embedded video link in the user selectable object; and logic to store the composite electronic representation as a PDF, HyperText Transfer Language (HTML), Flash or Word formatted document for access by the user or another user accessing the composite electronic document.

46. The data processing system of claim 45, further comprising logic to determine association information for the recorded information that corresponds to the text extracted feature.

47. The data processing system of claim 46, further comprising logic to associate the association information with the determined additional information in the composite electronic representation.

48. The data processing system of claim 47, further comprising:

logic to receive a selection of the determined additional information in the composite electronic representation; and logic to use the association information for the determined information to access the recorded information.

49. The data processing system of claim 45, further comprising logic to access recorded information using the determined additional information.

50. The data processing system of claim 45, further comprising:

logic to perform at least one of emailing, printing, storing, displaying, playing, and copying the created composite electronic representation.

51. The data processing system of claim 45, wherein the received electronic representation includes notes taken by a user, wherein the created composite electronic representation includes the notes taken by the user.

52. The data processing system of claim 45, wherein the document comprises a paper document.

53. A data processing system creating a composite electronic representation of a document using information recorded during a presentation, the data processing system comprising:

a processor;

a memory coupled to the processor, the memory configured to store a plurality of modules for execution by the processor, the plurality of modules comprising:

logic to scan a paper document to generate an electronic representation of the document for the presentation having text;

logic to apply an optical character recognition (OCR) algorithm to the electronic representation to generate OCR determined text;

logic to access recorded information including audio and visual information recorded during the presentation, and using a matching algorithm to compare the OCR determined text to the audio of the recorded information to determine a portion of the recorded information that matches the OCR determined text, the matching algorithm configured to map the OCR determined text to a portion of any of a plurality of recorded information having audio that matches the OCR determined text and generate matching information in response thereto;

logic to generate composite information based on the audio of the portion of the recorded information that corresponds to the OCR determined text in the electronic representation of the document;

logic to generate a user selectable object providing a user with access to the portion of the recorded information corresponding to the OCR determined text in, and inserting the user selectable object and metadata including the matching information into the electronic representation of the document when the computer system locates a portion of the recorded information corresponding to the OCR determined text in, the computer system thus creating a composite electronic representation of the document including the user selectable object and the metadata, the user selectable object being placed in a position associated with the extracted feature and allowing the user to access the composite information in an application displaying the composite electronic representation or a separate application by selecting the user selectable object, the user-selectable object being able to access the portion of the recorded information using an embedded video link in the user selectable object; and logic to store the composite electronic representation as a PDF, HyperText Transfer Language (HTML), Flash or Word formatted document for access by the user or another user accessing the composite electronic document.

54. The data processing system of claim 53, further comprising logic to determine association information for the recorded information that corresponds to the feature.

55. The data processing system of claim 54, wherein the association information comprises time information for recorded information, the time information indicating a time when information related to the feature was presented during the presentation.

56. The data processing system of claim 55, further comprising:

logic to use the association information for the determined composite information in the composite electronic representation to access the recorded information for the presentation at a time indicated by the time information.

57. The data processing system of claim 53, further comprising logic to perform at least one of emailing, printing, storing, displaying, playing, and copying the created representation.

58. The data processing system of claim 53, wherein the document comprises a paper document.

* * * * *